United States Patent
Arbabian et al.

(10) Patent No.: US 12,299,931 B2
(45) Date of Patent: *May 13, 2025

(54) METHOD AND APPARATUS FOR CAMERA CALIBRATION

(71) Applicant: Plato Systems, Inc., San Carlos, CA (US)

(72) Inventors: Mohammad Amin Arbabian, San Francisco, CA (US); Akbar Ghasemi, Cupertino, CA (US); Matthew Thornton, San Francisco, CA (US); Hao Nan, San Mateo, CA (US); Mashhour Solh, San Jose, CA (US)

(73) Assignee: Plato Systems, Inc., San Carlos, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/859,547

(22) Filed: Jul. 7, 2022

(65) Prior Publication Data

US 2022/0345685 A1 Oct. 27, 2022

Related U.S. Application Data

(63) Continuation of application No. 16/854,375, filed on Apr. 21, 2020.

(51) Int. Cl.
*G06T 7/80* (2017.01)
*G06F 16/55* (2019.01)
(Continued)

(52) U.S. Cl.
CPC ............... *G06T 7/80* (2017.01); *G06F 16/55* (2019.01); *G06F 18/24* (2023.01); *G06V 10/25* (2022.01);
(Continued)

(58) Field of Classification Search
CPC ............... G06F 16/55; G06F 18/24; G06T 2207/10044; G06T 7/80; G06V 10/25;
(Continued)

(56) References Cited

U.S. PATENT DOCUMENTS 10,166,999 B1 * 1/2019 Weng ................... B60W 50/14
11,161,456 B1 * 11/2021 Day .......................... B60R 1/26
(Continued)

FOREIGN PATENT DOCUMENTS

JP 2018163096 10/2018
JP 2018189637 11/2018
(Continued)

OTHER PUBLICATIONS

"U.S. Appl. No. 16/854,375, 312 Amendment filed Jun. 24, 2022", 9 pgs.
(Continued)

*Primary Examiner* — Anner N Holder
(74) *Attorney, Agent, or Firm* — Schwegman, Lundberg & Woessner, P.A.

(57) ABSTRACT

An imaging system is provided comprising: a memory storing instructions which, when executed by processing circuitry, cause the processing circuitry to perform operations comprising: determining multiple image regions of interest (ROIs) within a camera image plane that correspond to one or more three-dimensional (3D) world object images; determining multiple radar ROIs that correspond to one or more 3D world objects; determining 3D world distances corresponding to the radar ROIs; determining multiple co-registered ROI pairs by co-registering individual image ROIs with individual radar ROIs corresponding to common 3D world objects; adjusting one or more parameters associated with the camera, based upon the co-registered ROI pairs.

27 Claims, 22 Drawing Sheets

(51) Int. Cl.
*G06F 18/24* (2023.01)
*G06V 10/25* (2022.01)
*H04N 13/239* (2018.01)
*H04N 13/296* (2018.01)

(52) U.S. Cl.
CPC ......... *H04N 13/239* (2018.05); *H04N 13/296* (2018.05)

(58) Field of Classification Search
CPC ... H04N 13/239; H04N 13/246; H04N 13/296
See application file for complete search history.

(56) References Cited

U.S. PATENT DOCUMENTS

| | | | |
|---|---|---|---|
| 11,418,773 | B2 | 8/2022 | Arbabian et al. |
| 2008/0164985 | A1 | 7/2008 | Iketani et al. |
| 2009/0102946 | A1* | 4/2009 | Tischer .................. H04N 23/70 348/222.1 |
| 2009/0167931 | A1* | 7/2009 | Kanai .................. H04N 23/61 396/89 |
| 2009/0228204 | A1* | 9/2009 | Zavoli .................. G01C 21/30 701/532 |
| 2010/0100539 | A1* | 4/2010 | Davis .................. G06F 18/40 707/723 |
| 2010/0100835 | A1* | 4/2010 | Klaric .................. G06V 30/422 715/810 |
| 2010/0240986 | A1* | 9/2010 | Stiles .................. A61B 5/062 606/130 |
| 2011/0187704 | A1* | 8/2011 | Chen .................. G06T 17/00 345/419 |
| 2013/0335569 | A1 | 12/2013 | Einecke et al. |
| 2013/0342640 | A1 | 12/2013 | Li et al. |
| 2015/0178884 | A1 | 6/2015 | Scholl et al. |
| 2015/0371431 | A1* | 12/2015 | Korb .................. G06T 7/75 382/113 |
| 2017/0085771 | A1 | 3/2017 | Schwager et al. |
| 2018/0107871 | A1 | 4/2018 | Singh et al. |
| 2019/0120955 | A1 | 4/2019 | Zhong et al. |
| 2019/0122378 | A1* | 4/2019 | Aswin .................. G06T 7/20 |
| 2019/0147331 | A1* | 5/2019 | Arditi .................. G01C 21/32 706/20 |
| 2019/0325580 | A1* | 10/2019 | Lukac .................. G06T 3/4038 |
| 2019/0392242 | A1 | 12/2019 | Tariq et al. |
| 2020/0112684 | A1 | 4/2020 | Ingram et al. |
| 2020/0284883 | A1* | 9/2020 | Ferreira .............. H04N 25/773 |
| 2021/0133996 | A1 | 5/2021 | Zhou et al. |
| 2021/0329221 | A1 | 10/2021 | Arbabian et al. |

FOREIGN PATENT DOCUMENTS

| | | |
|---|---|---|
| JP | 2023515704 | 4/2023 |
| JP | 7382043 | 11/2023 |
| WO | WO-2021216561 A2 | 10/2021 |
| WO | WO-2021216561 A3 | 12/2021 |

OTHER PUBLICATIONS

"U.S. Appl. No. 16/854,375, Non Final Office Action mailed Sep. 2, 2021", 16 pgs.

"U.S. Appl. No. 16/854,375, Notice of Allowance mailed Mar. 25, 2022", 7 pgs.

"U.S. Appl. No. 16/854,375, PTO Response to Rule 312 Communication mailed Jul. 1, 2022", 2 pgs.

"U.S. Appl. No. 16/854,375, Response filed Dec. 2, 2021 to Non Final Office Action mailed Sep. 2, 2021", 24 pgs.

"International Application Serial No. PCT/US2021/028173, International Search Report mailed Nov. 24, 2021", 7 pgs.

"International Application Serial No. PCT/US2021/028173, Invitation to Pay Additional Fees mailed Aug. 10, 2021", 15 pgs.

"International Application Serial No. PCT/US2021/028173, Written Opinion mailed Nov. 24, 2021", 15 pgs.

Deokkyu, Kim, et al., "Extrinsic parameter calibration of 2D radar-camera using point matching and generative optimization", 2019 19th International Conference On Control, Automation and Systems (ICCAS), Institute of Control, Robotics and Systems—ICROS, (Oct. 15, 2019), 99-103.

El, Natour Ghina, et al., "Radar and vision sensors calibration for outdoor 3D reconstruction", 2015 IEEE International Conference On Robotics and Automation (ICRA), IEEE,, (May 26, 2015), 2084-2089.

Fumio, Itami, et al., "A Simple Calibration Procedure for a 2D LiDAR With Respect to a Camera", IEEE Sensors Journal, IEEE Service Center, New York, NY, US, (Sep. 1, 2019), 7553-7564.

"International Application Serial No. PCT US2021 028173, International Preliminary Report on Patentability mailed Nov. 3, 2022", 17 pgs.

"European Application Serial No. 21724897.0, Response to Communication pursuant to Rules 161(1) and 162 EPC filed Apr. 5, 2023", 33 pgs.

"Japanese Application Serial No. 2022-564179, Notification of Reasons for Refusal mailed Apr. 18, 2023", With English machine translation, 15 pgs.

"Japanese Application Serial No. 2022-564179, Response filed Jul. 12, 2023 to Notification of Reasons for Refusal mailed Apr. 18, 2023", With English Machine Translation, 30 pgs.

"European Application Serial No. 21724897.0, Communication Pursuant to Article 94(3) EPC mailed Nov. 13, 2023", 14 pgs.

\* cited by examiner

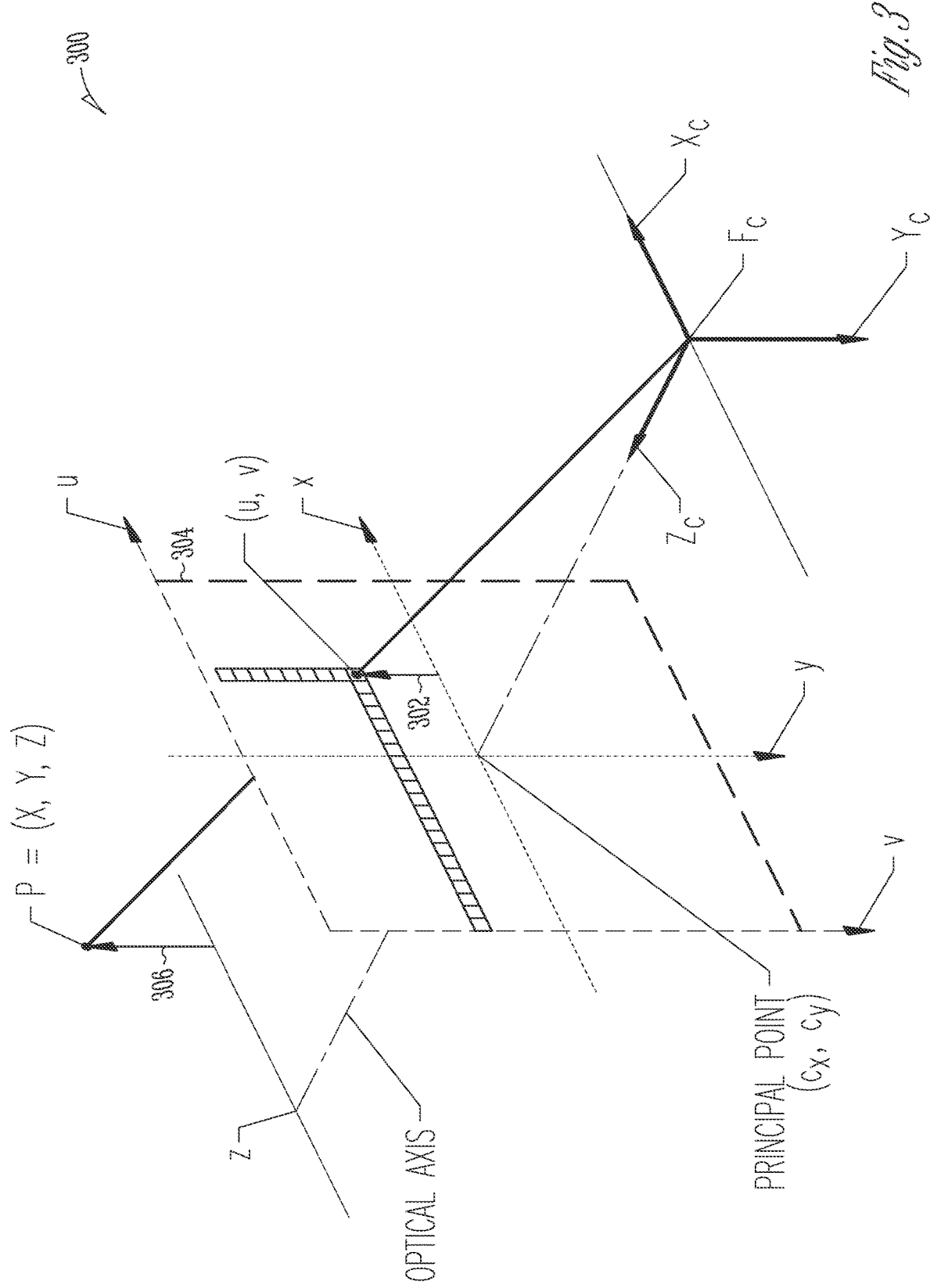

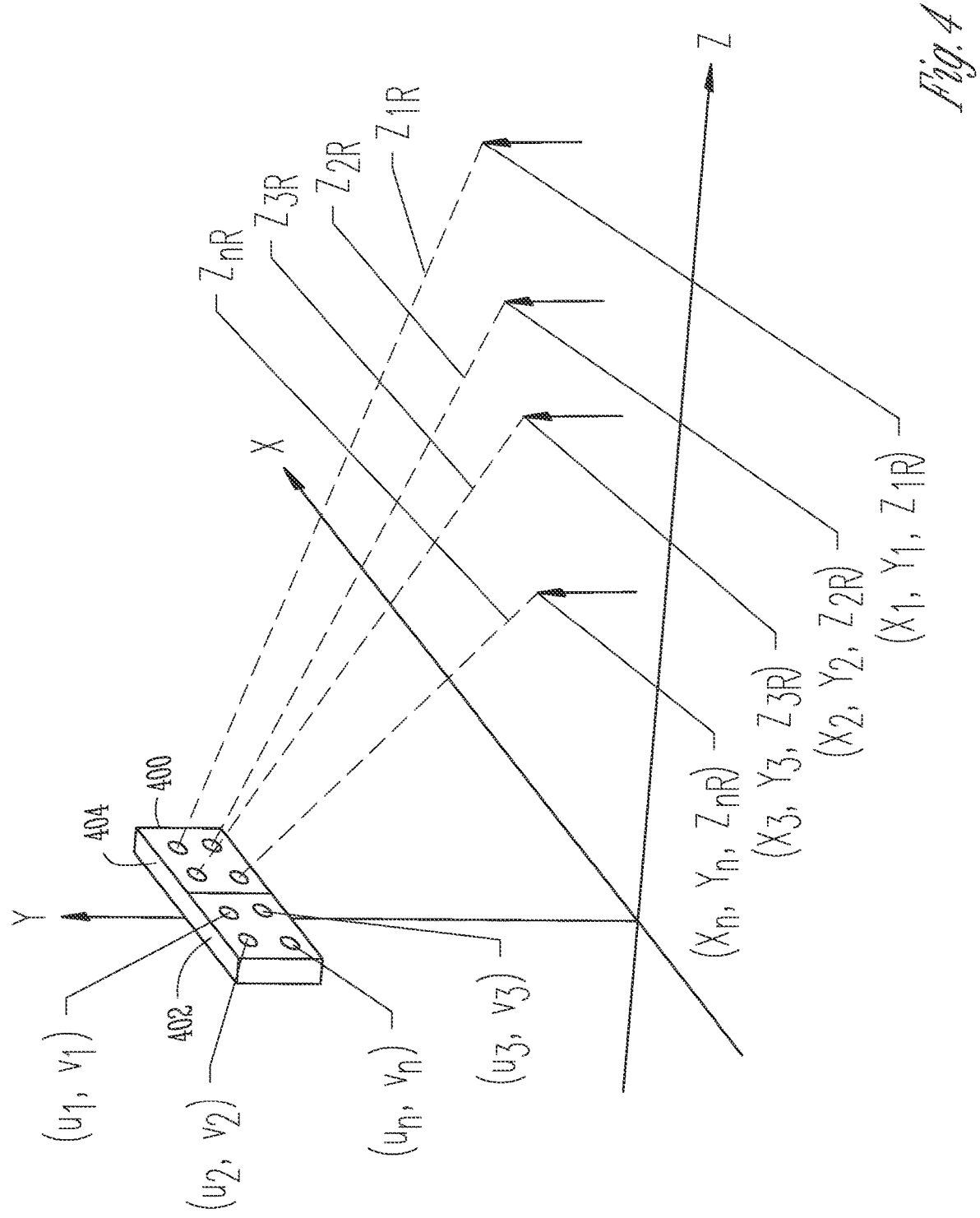

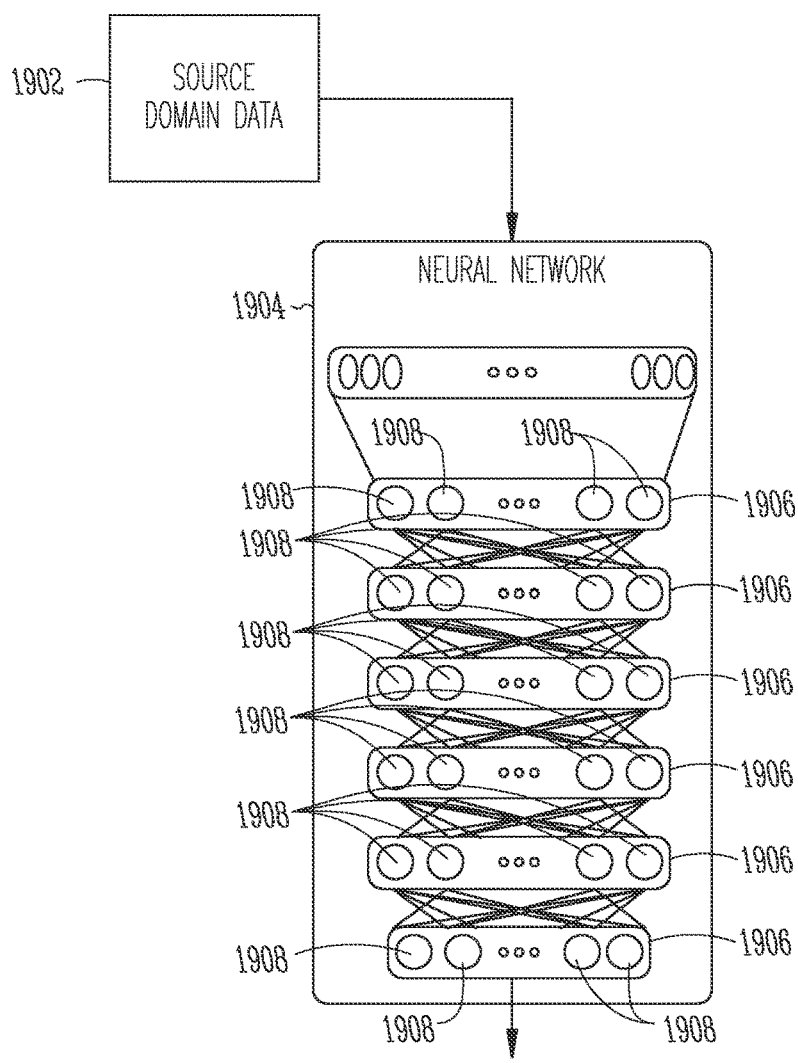
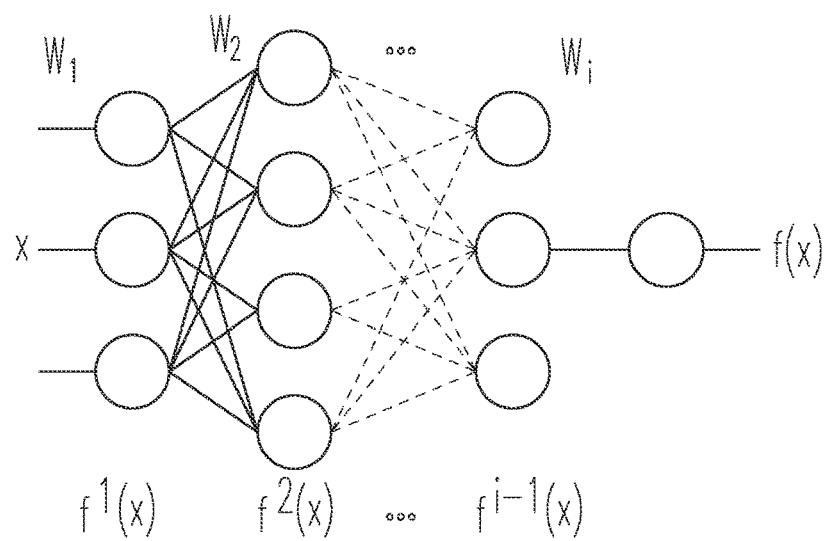
Fig. 19

METHOD AND APPARATUS FOR CAMERA CALIBRATION

CLAIM OF PRIORITY

This application is a continuation of U.S. patent application Ser. No. 16/854,375, filed on Apr. 21, 2020, which is hereby incorporated by reference in its entirety.

BACKGROUND

Geometric Camera Parameters

A camera is an optical instrument to project three-dimensional (3D) world images onto a flat surface referred to as an image plane. Camera images may or may not be within the visible light spectrum. A camera-based vision system characterizes its environment as a two-dimensional image. A camera can be used to infer the depth or range of detected objects. Optical images captured at camera pixels in the image plane are transformed to real world depth measurements to analyze certain aspects of a scene, such as the size or position of objects. However, a camera generally must be calibrated periodically with geometric parameters, also referred to as extrinsic parameters, that provide precise camera location and camera pose information required to accurately infer spatial relations from its images. In stereo camera systems, this transformation from pixel coordinates to depth information can be done with disparity computation between the camera sensors after basic calibration, and in monocular systems this typically can be done with prior scene parameters/rules or with machine learning methods known in the art. In a mono camera system, for example, camera height and angle relative to a ground plane must be known (or calibrated for) precisely in order to infer high quality depth maps. In a multi-camera system, for example, the relative distance and pose of the cameras with respect to one another must be known (or calibrated for) precisely in order to infer high quality depth maps.

Calibration of a multi-camera system typically is primarily to estimate a mathematical matrix that maps between a 3D world and each individual camera view. The matrix mapping includes geometric parameters that provide translation distances and relative angles between cameras in a multi-camera system. Calibration of geometric parameters has six degrees of freedom in terms of translation and rotation between two cameras. A mapping or reprojection between camera views also can be inferred from these matrices. A perfect calibration results in zero reprojection error among the camera views. Often, geometric calibration is performed using a checkerboard pattern placed at some known distance. In general, however, any 3D world features with some prior knowledge of the pattern can be used, e.g., size of the squares in a checkerboard pattern.

FIGS. 1A-1B are illustrative drawings showing an example stereo camera system including a left camera 102 and a right camera 104 with cameras horizontally aligned parallel in an x-axis (FIG. 1A) and showing an example stereo camera system with a relative rotation of the right camera 104 such that the left and right cameras 102, 104 are misaligned in the x-axis (FIG. 1B). In both the aligned and misaligned examples, an image of an object 106 in a 3D world is projected on a left camera image plane 108 and a right camera image plane 110. For the horizontally aligned cameras example in FIG. 1A, a z-distance of the object from the cameras can be calculated as, $$Z = BF/(xL - xR) \quad (1)$$

where Z is the distance from the object computed based upon geometric parameters, B is distance between the cameras, F is focal length, xL is x-axis offset of the object image within the left camera, and xR is offset of the object image within the right camera. For the misaligned camera image planes example in FIG. 1B, an unknown, angular offset in the misaligned (right) cameras example will correspond to a shift (dx) of the object in the (right) image plane FIG. 1B. In this misaligned stereo camera example, without camera calibration, if we assume zero rotation between the cameras, the z-distance of the object from the cameras will be calculated as, $$Z\_hat = BF/(xL - xR - dx) \quad (2)$$

Taking into consideration the offset on the right side as xR+dx, Z_hat is the computed distance of the object based on the uncalibrated, zero rotation geometric parameters. In this example Z_hat<Z. Thus, a small, unknown (uncalibrated) rotation of the cameras with respect to each other influences the accuracy of the z-direction measurement of the cameras. In order to resolve this inaccuracy in depth estimation, one must properly calibrate to determine the precise pose of the cameras with respect to each other.

Unfortunately, in actual use in the field, various geometric factors such as vibrations, mechanical shock, large temperature variations, stress/strain on fixture, for example, can frequently and repeatedly throw off camera calibration, which can necessitate more frequent calibration. Moreover, actual distances from 3D world objects in the field generally are unknown and estimated distance using a camera optics generally is accurate only to a camera scale factor. Therefore, there exists a need to accurately and quickly adjust geometric parameters used to calibrate the pose of camera systems in the field where actual distances are unknown.

Photometric Camera Parameters

A vision system whether comprised of a single camera or multiple cameras can require photometric calibration to achieve acceptable image quality. For a mono-camera the photometric calibration can involve setting photometric parameters (sometimes referred to as 'intrinsic' parameters) such as auto-exposure (AE), auto-white balance (AWB), and auto-focus (AF), (the '3A' parameters), gain, and HDR, for example, to achieve visibility of the scene in varied conditions including mixed lightening and challenging scenarios (such as WDR, low light, direct sun-light). For a multi-camera system a calibration also can involve photometric calibration across the camera views to achieve a uniform visual experience in 3A, gain/tone mapping and HDR. In low light or dark conditions, a multi-camera system is usually coupled with one or more illuminators (visible and/or IR) and in these conditions a continuous photometric correction is usually needed between the illuminator power and the camera's photometric calibration settings to avoid saturation, avoid noisy images and maintain uniformity across views.

SUMMARY

In one aspect, an imaging system is provided that includes a memory storing instructions which, when executed by processing circuitry, cause the processing circuitry to perform operations. The operations include using a camera to receive image information projected at an image plane of the first camera from a 3D world. The operations include determining multiple image regions of interest (ROIs) based upon the image information, wherein individual ones of the multiple image ROIs correspond to one or more three-dimensional (3D) world object images projected at the image plane. The operations include using a radar unit to receive radar information indicating one or more 3D world objects. The operations include determining multiple respective radar ROIs are determined that correspond to one or more 3D world objects. The operations include determining 3D world distances that correspond to the radar ROIs. The operations include determining multiple co-registered ROI pairs by co-registering individual image ROIs with individual radar ROIs corresponding to common 3D world objects. The operations include adjusting one or more geometric parameters associated with the camera based upon the co-registered ROI pairs.

In another aspect, an imaging system is provided that includes a memory storing instructions which, when executed by processing circuitry, cause the processing circuitry to perform operations. The operations include receiving an image of an object using a camera calibrated using a group of intrinsic parameters. The operations include determining luminance information using the camera. The operations include, receiving, using a radar unit, radar information indicating an object. The operations include, determining based upon the radar information, a speed to associate with the object. The operations include adjusting one or more intrinsic parameters of the group of intrinsic parameters based upon the determined luminance information and the tracked speed of the object.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is an illustrative drawing representing an example known pinhole camera model.

FIG. 4 is an illustrative drawing showing an example single camera system architecture with depth-sensor based camera calibration.

FIG. 19 illustrates an example neural network, in accordance with some embodiments.

DESCRIPTION OF EMBODIMENTS

Figure 1B:
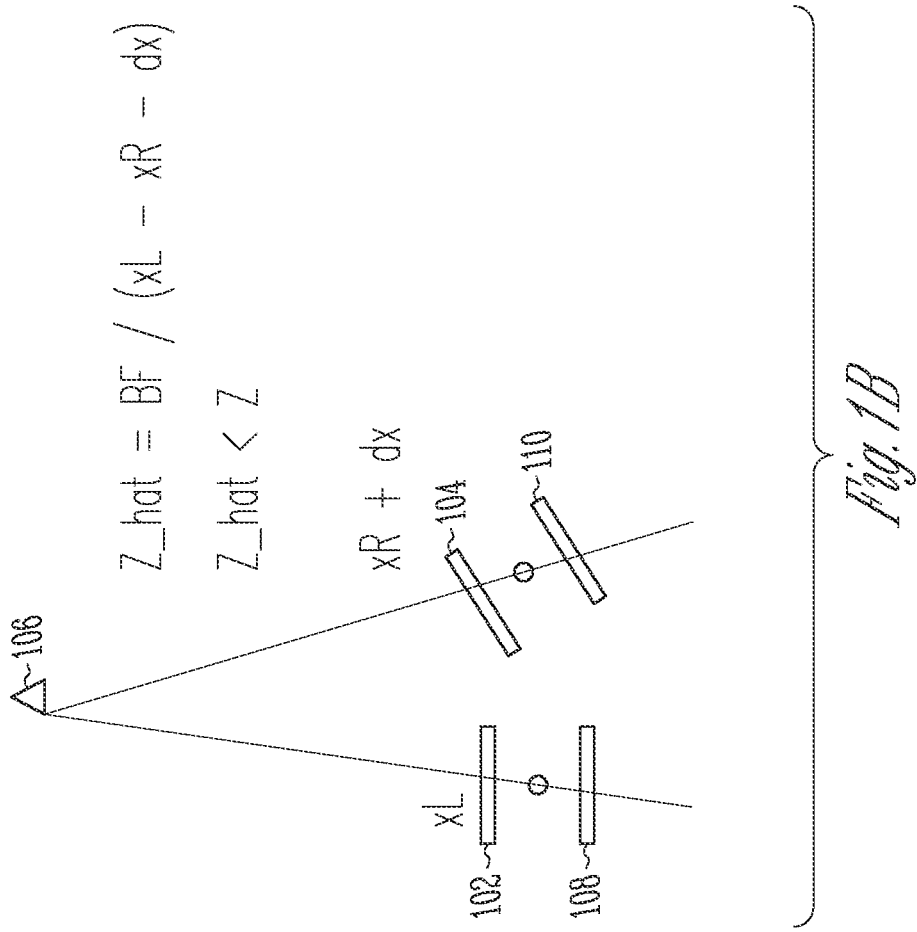
FIGS. 1A-1B are illustrative drawings showing an example stereo camera system with camera image planes aligned parallel in the x-axis (FIG. 1A) and misaligned in a horizontal (FIG. 1B).
Figure 1A:
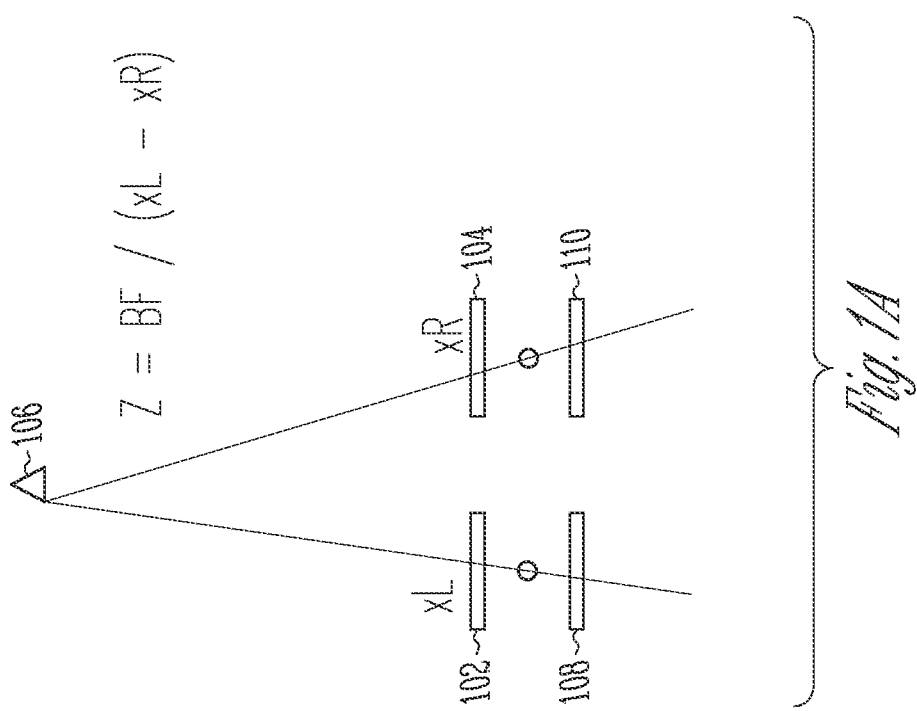

The following description is presented to enable any person skilled in the art to create and use a system to use calibration of geometric and photometric camera parameters based upon information determined using radar. Various modifications to the embodiments will be readily apparent to those skilled in the art, and the generic principles defined herein may be applied to other embodiments and applications without departing from the spirit and scope of the inventive subject matter. Moreover, in the following description, numerous details are set forth for the purpose of explanation. However, one of ordinary skill in the art will realize that the inventive subject matter might be practiced without the use of these specific details. In other instances, well-known components, processes and data structures are shown in block diagram form in order not to obscure the disclosure with unnecessary detail. Identical reference numerals may be used to represent different views of the same item in different drawings. Flow diagrams in drawings referenced below are used to represent processes. A computer system may be configured to perform some of these processes. Blocks within flow diagrams representing computer implemented processes represent the configuration of a computer system according to computer program code to perform the acts described with reference to these blocks. Thus, the inventive subject matter is not intended to be limited to the embodiments shown, but is to be accorded the widest scope consistent with the principles and features disclosed herein.

Calibration of Geometric Camera Parameters

Imaging System Architecture with Depth Sensor-Based Camera Calibration

Figure 2A:
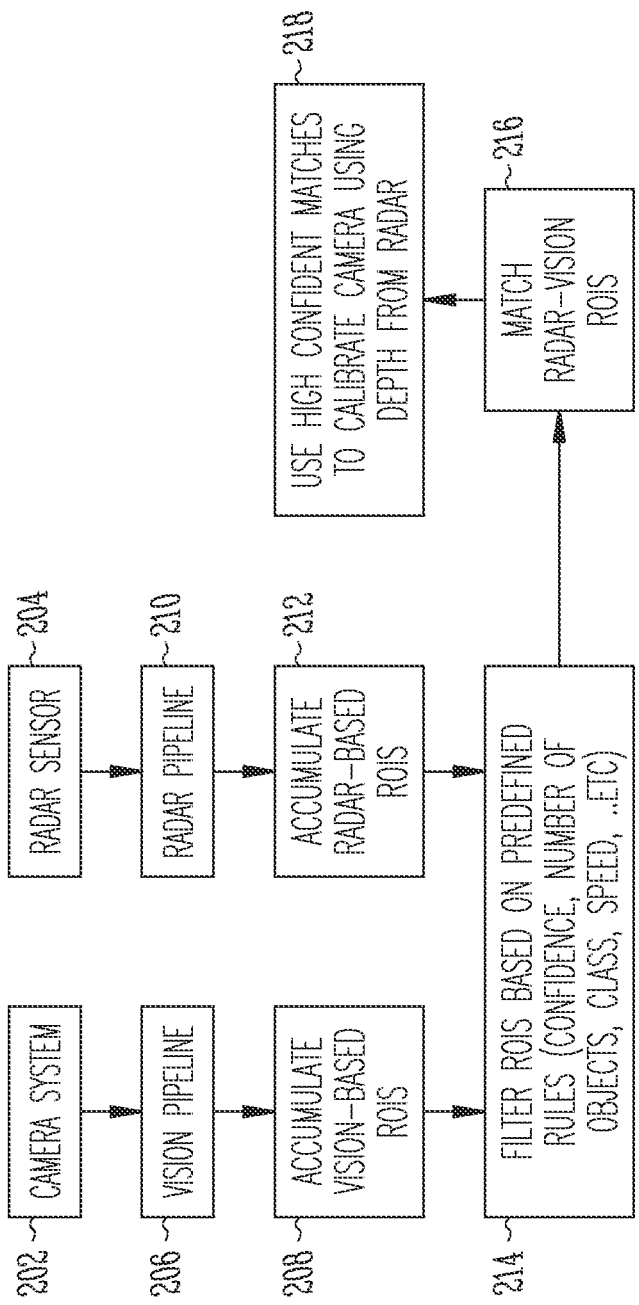
FIG. 2A is an illustrative schematic block diagram of an example imaging system architecture with depth sensor-based camera calibration.

FIG. 2A is an illustrative schematic block diagram of an example an imaging system architecture 200 with depth sensor-based camera calibration. The imaging system 200 includes a camera system 202, a radar-based depth sensor 204, and a computing machine described below with reference to FIG. 12, including one or more processor devices configured to operatively couple to one or more non-transitory storage devices that store instructions to configure the processing devices to perform the block functions described as follows.

An example camera system 202 can include one or more cameras to capture two-dimensional (2D) image information from a three-dimensional (3D) world scene. A camera pipeline block 206 processes image information and corresponding tracking information and corresponding classification information to extract image regions of interest (ROIs) that correspond to images of 3D world objects within a scene. An image data buffer block 208 stages a sequence of image information frames together with corresponding tracking and classification information for use in geometric calibration processing.

An example radar unit 204 can have single transmit/receive (Tx/Rx) units or operate as phased array or MIMO with multiple Tx/Rx units, for example. Alternatively, an example depth sensor such as a LiDAR sensor, a time of flight (ToF) camera, or an acoustic sensor can be used in place of the radar unit, for example. The radar unit 204 sensor captures scene information that includes distances of objects from the imaging system 200. In an example system, a depth sensor includes a radar unit that captures radar information that can include radar metadata that is indicative of one or more physical relationships between an objects within a scene detected by the radar unit and the imaging system 200, such as distance, relative speed and angle. A radar data pipeline block 210 processes captured radar data and corresponding tracking information and corresponding classification information to extract radar ROIs that correspond to images of 3D world objects within a scene in a sequence of radar frames. A radar data buffer block 212 stages a sequence of radar data frames together with corresponding tracking and classification information for use in geometric calibration processing.

The camera system 202 and the radar unit can be geometrically co-registered. An ROI filter block 214 can filter image ROIs and can filter radar ROIs used in adjusting geometric parameters (also referred to as 'extrinsic' parameters) during camera calibration. An example filter block 214 can filter based upon one or more of threshold number of classified ROIs, classification confidence levels, and distance loss as between image ROIs and radar ROIs, for example. An ROI matching block 216 matches image ROIs and radar ROIs that correspond to a common 3D world object, such as a person, dog, or car, for example to determine co-registered ROI pairs. A calibration block 218 adjusts the camera system's geometric parameters based upon co-registered ROI pairs and corresponding depth sensor metadata to calibrate the camera system.

Figure 2B:
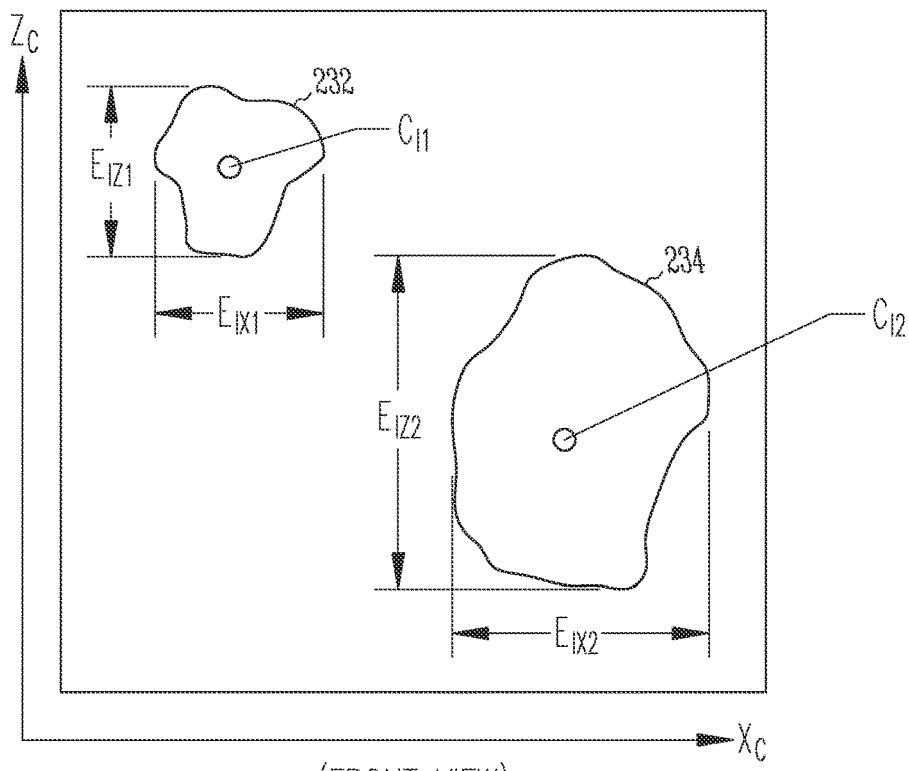
FIG. 2B is an illustrative drawing representing location of first and second radar ROIs identified within an example radar field of view of the imaging system of FIG. 2.
Figure 2C:
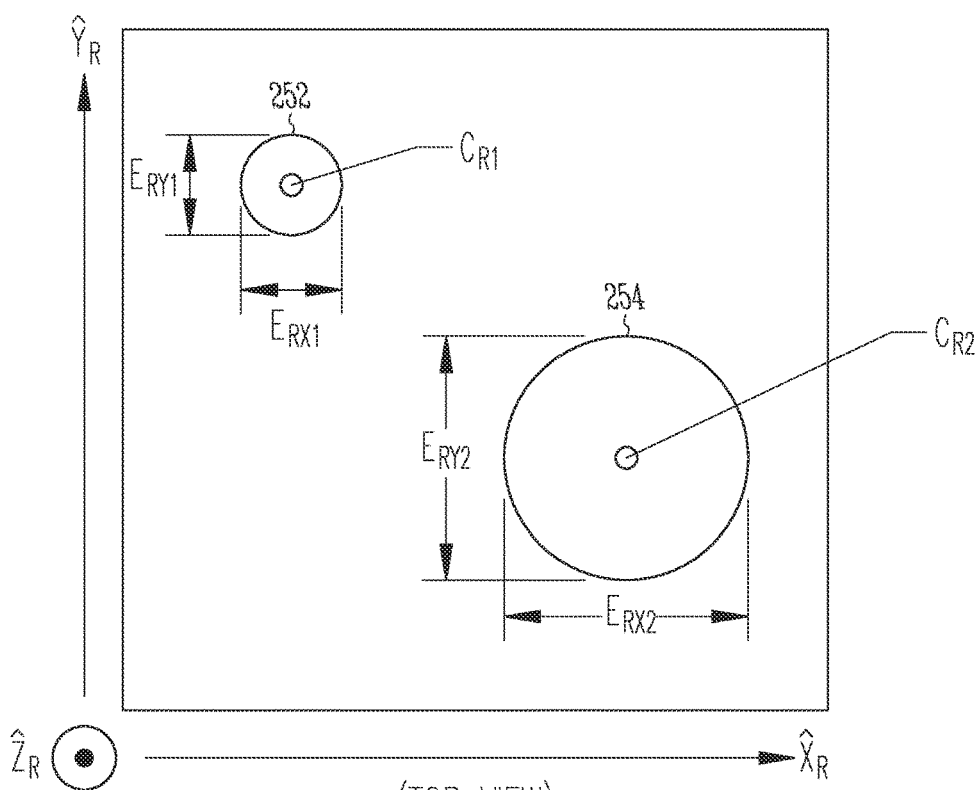
FIG. 2C is an illustrative drawing representing location of first and second image ROIs identified within an example camera field of view of the imaging system of FIG. 2.

FIG. 2B is an illustrative drawing representing location of first and second image ROIs 232, 234 identified using the camera pipeline block 206 within a camera field of view 230 of the imaging system 200 of FIG. 2. FIG. 2C is an illustrative drawing representing location of first and second radar ROIs 252, 254 identified using the radar pipeline block 210 within a radar field of view 230 of the imaging system 200 of FIG. 2.

Referring to FIG. 2B, an example camera field of view 230 has a $Z_C$-axis and an $X_C$-axis. The camera pipeline block 206 can identify the example first image ROI 232 and can determine corresponding first $Z_C$-axis extent $E_{IZ1}$, first $X_C$-axis extent $E_{IX1}$, and first image center location $C_{I1}$. The camera pipeline block 206 can identify the example second image ROI 234 and can determine corresponding second $Z_C$-axis extent $E_{IZ2}$, second $X_C$-axis extent $E_{IX2}$, second image center location $C_{I2}$. The center locations $C_{I1}$, $C_{I2}$, can be determined based upon determining median locations within the image ROIs 232, 234 or other centering metrics, for example. The pipeline block 206 also can determine classification and tracking of the first and second image ROIs 232, 234.

Referring to FIG. 2C, an example radar field of view 250 has a $Y_R$-axis and an $X_R$-axis. The camera pipeline block 206 can identify the example first image ROI 252 and can determine corresponding first $Y_R$-axis extent $E_{RY1}$, first $X_R$-axis extent $E_{RX1}$, and first radar center location $C_{R1}$. The camera pipeline block 206 can identify the example second radar ROI 254 and can determine corresponding second $Y_R$-axis extent $E_{RY2}$, second $X_R$-axis extent $E_{RX2}$, and second image center location $C_{R2}$. The pipeline block 206 also can determine classification and tracking of the first and second radar ROIs 252, 254.

An example ROI matching block 216 can be configured to match image ROIs and radar ROIs based upon the $X_C$ in the camera field of view (FOV) 230 and $X_R$ in the radar FOV since the camera system 202 and the radar unit 204 can be aligned in their respective $X_C$ and $X_R$ axes. Matching based upon $X_C$ and $X_R$ axes can be most suitable in sparse sense with fewer identified objects.

An example ROI matching block 216 can be configured to match image ROIs and radar ROIs based upon other data such as matching track histories of image ROIs and radar ROIs (e.g., direction, path of travel), matching classification (e.g., person, car, pet), matching extent (e.g., e.g., match image ROI extent with a corresponding radar ROI extent).

The calibration block 218 adjusts calibration based upon radar-determined distance. For example, assuming that the ROI matching block 216 co-registers image ROI 232 with radar ROI 252, and the radar unit 204 determines a distance distance=$Y_{R1}$ between the radar unit 204 and the center location $C_{R1}$ of radar ROI 250, then a center point $C_{I1}$ can be set as the radar-determined distance $Y_{R1}$. Similarly, assuming that the ROI matching block 216 co-registers image ROI 234 with radar ROI 254, and the radar unit 204 determines a distance distance=$Y_{R2}$ between the radar unit 204 and the center location $C_{R2}$ of radar ROI 254, then a center point $C_{I2}$ can be set at the radar-determined distance $Y_{R2}$. A plurality of radar-determined distances can be used as explained more fully below with reference to Tables 1, 2, 3 to determine best fit estimates of photometric parameters.

In an alternative example imaging system 200, radar unit 204 can provide radar information using spherical coordinates e.g., (range, θ, φ), which can be mapped to cartesian coordinates (x, y, z). Moreover, in an alternative example imaging system 200, a radar unit 204 can tack a cluster of locations at a radar ROI and use a median range of an area of locations on the radar ROI as a radar distance.

Camera Model Example

This section describes a known pinhole camera model to provide an illustrative general example of the kinds of geometric parameters that can require adjustment during calibration of the example imaging systems described herein.

FIG. 3 is an illustrative drawing representing an example known pinhole camera model 300. A 2D image is formed in an image plane 302 to represent a 3D world object. A 3D point P=(X, Y, Z) on the 3D real world image object 306 corresponds to a 2D point (u, v) in the image plane. The example pinhole camera model 300 includes a camera center located at Fc. An optical axis Zc, also referred to as a principle axis, extends through a principal point (cx, cy) of the image plane. Images from one or more cameras can be used to analyze spatial relationships of a 3D world scene, such as the size or position of objects relative to an example camera and relative to each other. Using a pinhole camera approximation, for example, a mapping of positions in a 3D world scene and their locations in an image plane is governed by the following example projection transformation expression.

$$S[u \ v \ 1] = [f_x \ \gamma c_x \ 0 \ f_y \ c_y \ 0 \ 0 \ 1]$$
$$[r_{11} \ r_{12} \ r_{13} \ t_1 \ r_{21} \ r_{22} \ r_{23} \ t_2 \ r_{31} \ r_{32} \ r_{33} \ t_3]$$
$$[X \ Y \ Z \ 1] \quad (3)$$

where (u, v) represents a pixel location in the image plane and (X, Y, Z) is a corresponding location in a 3D world. An intrinsic (photometric) parameter matrix (referred to herein as 'K') includes: $f_x$, $f_y$ which represent focal length in the x-axis and the y-axis respectively; ($c_x$, $c_y$), which represent coordinates of the principal point; and $\gamma$, which describes the relative orthogonality of the image axes. To simplify the explanation, $\gamma=0$ is assumed, which is typical for digital cameras. An geometric parameter matrix (referred to herein as '[R t]') includes rotation parameters $r_{11}$-$r_{33}$ and translation parameters, $t_1$-$t_3$. The geometric parameters can represent camera pose in six degrees of freedom: three translation axis directions along the, x-axis, y-axis, and z-axis; and three angular rotation directions about the, x-axis, y-axis, and z-axis. The value S represents a scale factor used to denote either $f_x$ or $f_y$ as determined by context.

The projection transformation expression (1) can be represented in a simplified from as, $$S^* p_c = K[R \ t] P_w \quad (4)$$

Where $p_c$ is coordinate location of an image projection in the camera image plane: $p_c = (x, y, 1)^T$ and $P_w$ is a 3D world location of corresponding object: $P_w = (X, Y, Z, 1)^T$ Camera pose must be properly calibrated to successfully infer spatial relations within a 3D world based upon images formed on the camera image plane. Assuming that intrinsic (photometric) parameters are constant, calibration involves adjustment of geometric parameters within the example geometric parameter matrices camera projection matrix, [R t].

Single Camera System with Depth Sensor-Based Camera Calibration

FIG. 4 is an illustrative drawing showing an example simplified diagram of a single camera system 400 with depth-sensor based camera calibration that can be implemented using the example imaging system architecture 200 of FIG. 2A. The example single camera system 400 includes a camera 402 and a includes a radar-based depth sensor 404. The single camera (also referred to as a mono-camera) 402 and the radar unit 404 have a known fixed geometric relationship between them; distance between them and angular rotation relationships between their fields of view are known and fixed. In an example system 400, the camera and the radar unit 404 are geometrically co-registered: the camera 402 can be calibrated to estimate 3D coordinates of 3D world objects appearing in a scene and may have the same 3D frame of reference as the radar unit 404. Thus, there is a known mathematical transform relationship that can be used to transform between the camera coordinates and radar coordinates. In an example system, the camera 402 and the radar unit 404 can be located on a single circuit module.

An example mono-camera 402 is associated with geometric parameters measured relative to a ground plane. The mono-camera 402 is positioned relative to an (x, y, z) coordinate system in which an (x, y) plane is located in a ground plane and a z-axis extends through the camera, which is located at a height (H) above the (x, y) ground plane. Geometric parameters of the example mono-camera include rotational parameters R relative to the ground plane (e.g., parallel to the x-axis, y-axis, and z-axis) and H.

Figure 5:
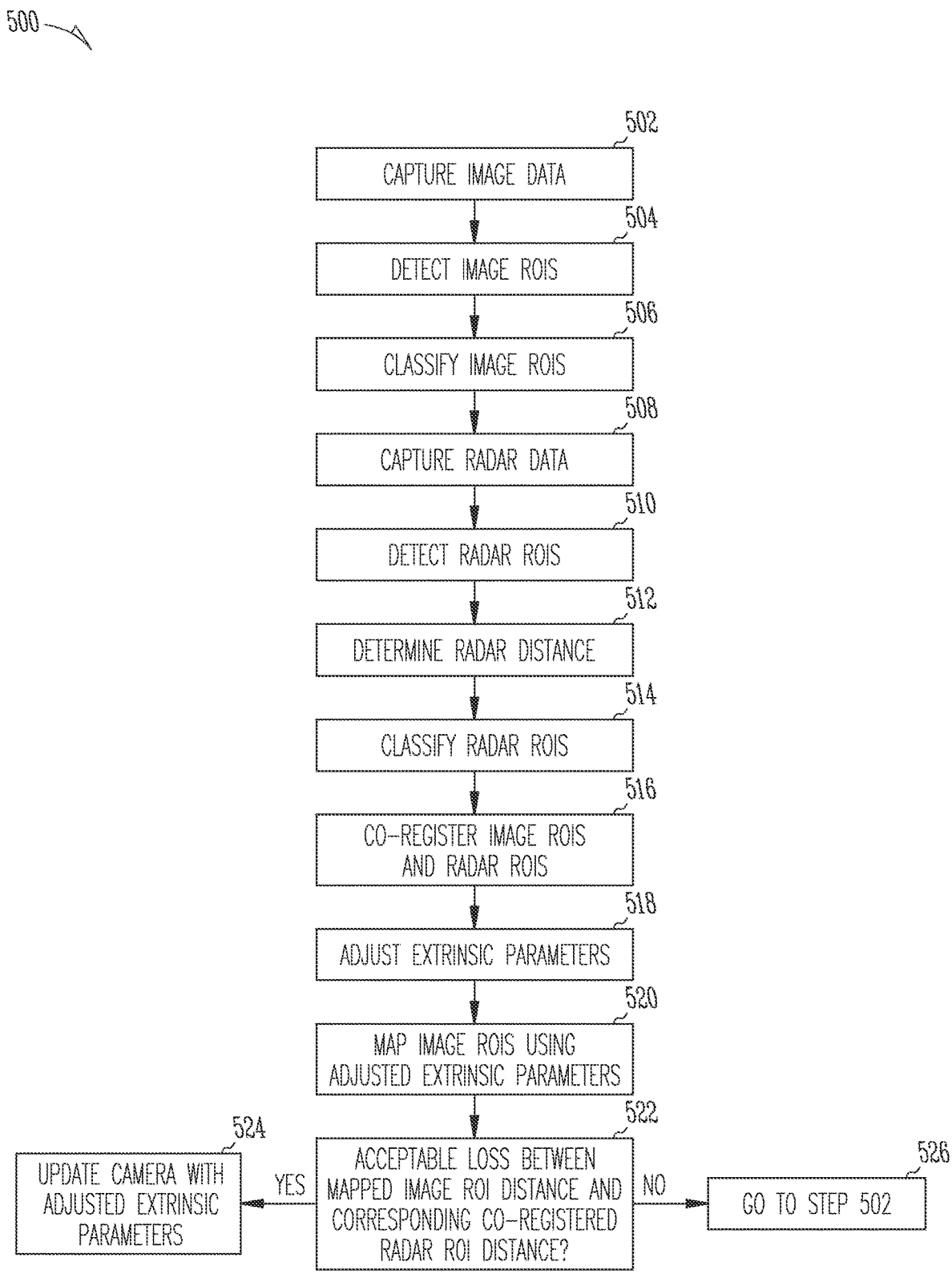
FIG. 5 is an illustrative flow diagram representing an example calibration process for the example single camera of FIG. 4.

FIG. 5 is an illustrative flow diagram representing an example process 500 to calibrate pose of the camera 402. The process 500 can run using instructions stored in one or more storage devices to configure one or more processing devices of the imaging system architecture 200. Referring to FIG. 5, step 502 captures image data from the camera FOV at an image plane of the camera. Step 504 can use a trained machine learning model to detect image regions of interest (ROIs) within the image data. Step 506 can use a trained machine learning engine to classify the image ROIs based upon 3D world objects corresponding to the image ROIs. Step 508 captures radar data from the radar FOV. Step 510 detects radar ROIs within the radar data. Step 512 determines radar distances from 3D world objects to associate with the radar ROIs. Step 514 can use a trained machine learning engine to classify the radar ROIs based upon 3D world objects corresponding the radar ROIs. Step 516 matches image ROIs and radar ROIs that correspond to common 3D world objects to determine co-registered ROI pairs. In particular, an example step 516 can match by tracking a motion pattern of both ROIs and associate them based on the trajectory similarity. An example step 516 can minimize a euclidean distance of both ROI's after projecting the radar ROI to the image plane. In another example, step 516 can match by evaluating classifications associated with image ROIs and radar ROIs to identify image ROIs and radar ROIs that share a 3D world objects in common. Step 518 adjusts geometric parameters based upon co-registered ROI pairs and corresponding radar-determined distances. In an example geometric parameter adjustment process, a generalized least-squares fit process is used to adjust geometric parameters used in projections identified based upon co-registered ROI pairs and corresponding radar-determined 3D world distances.

The following Table 1 sets forth a set of example projections that are based on equation (4).

TABLE 1

| |
|---|
| $S * ((u_1, v_{1,1})^T = K_m[R \ t]_m * (X_1, Y_1, Z_{1R}, 1)^T$ |
| $S * ((u_2, v_{2,1})^T = K_m[R \ t]_m * (X_2, Y_2, Z_{2R}, 1)^T$ |
| $S * ((u_3, v_{3,1})^T = K_m[R \ t]_m * (X_3, Y_3, Z_{3R}, 1)^T$ |
| ... |
| $S * ((u_n, v_{n,1})^T = K_m[R \ t]_m * (X_n, Y_n, Z_{nR}, 1)^T$ |

Table 1 shows multiple example projections each involving an geometric parameter matrix $[R \ t]_m$ and an intrinsic (photometric) parameter matrix $K_m$ for the example mono-camera of FIG. 4. The geometric parameter matrix includes rotation parameters and a translation parameter, H. In a single camera embodiment, the translation parameter, T, may only include height above a ground plane. The intrinsic parameter matrix $K_m$ includes intrinsic parameters that are assumed to be constant. The fit process adjusts geometric parameters to fit the above example image projections. Specifically, for example, the geometric parameters are adjusted to fit the projection between $(u_1, v_1)$ and $(X_1, Y_1, Z_{1R})$, which both correspond to a first common 3D world object; to fit the projection between $(u_2, v_2)$ and $(X_2, Y_2, Z_{2R})$, which both correspond to a 10 second common 3D world object; to fit the projection between $(u_3, v_3)$ and $(X_3, Y_3, Z_{3R})$, which both correspond to a third common 3D world object; and to fit the projection between $(u_n, v_n)$ and $(X_n, Y_n, Z_{nR})$, which both correspond to an nth common 3D world object Adjustment of the geometric parameters can start from an initial pose setting such as initial height and angle estimates that can be ones measured during device installation, for example.

It will be assumed that the camera image plane and the radar unit are, in effect, at equal ranges, that is at equal distance magnitude, from respective 3D world objects since the distances from such objects are orders of magnitude greater than a distance between the camera and radar. The inventors realized that each radar-determined distance $Z_{1R}$, $Z_{2R}$, $Z_{3R}$ and $Z_{nR}$ in the example image projections, therefore, represents an actual distance between the camera and a respective 3D world point and that the determined distances can be used to determine a scaling factor S used in the projection equation. A scale factor S normalized to a unit range can be determined using a depth sensor-determined distance based upon the following relationship, $$S=1/f-d_{pixel}/Z_R \qquad (5)$$

where f is focal length, $Z_R$ is depth sensor-determined distance between an ideal lens plane and a 3D world object and $d_{pixel}$ is a dimension of the object in the camera image plane, measured in pixels.

A map image ROI step 520 uses the adjusted geometric parameters determined at step 518 to map co-registered image ROI coordinates from the camera (u, v) plane to a 3D world X, Z space. A decision step 522 determines whether differences between the mapped image ROI coordinates and corresponding coordinates of co-registered radar ROIs are within an acceptable error range. In an example imaging system 200, an example acceptable error range is within 0-2 pixels. In an example imaging system 200, an error range is selected such that a predefined cost function for matching ROIs is close to zero. In response to a determination that the difference is not acceptable, control to step 502. In response to a determination that the difference is acceptable, step 524 updates the camera using the adjusted geometric parameters to calibrate the camera to accurately infer spatial relationships in the camera FOV. In response to a determination that the difference is not acceptable, step 526 returns control to step 502.

Multiple Camera System with Depth-Sensor Based Camera Calibration

Figure 6A:
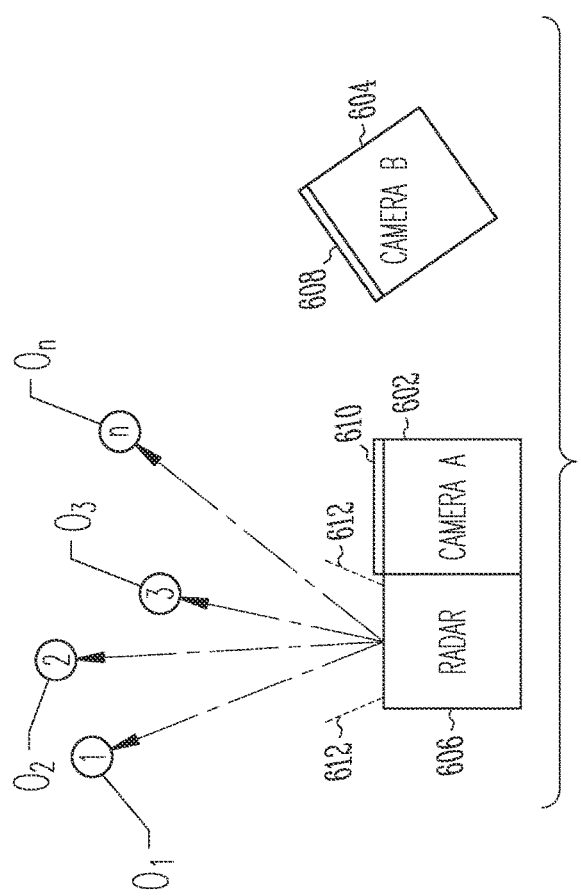
FIG. 6A is an illustrative example simplified diagram of a multi-camera system with depth-sensor based camera calibration.

FIG. 6A is an illustrative example simplified diagram of a multi-camera system 600 with depth-sensor based camera calibration that can be implemented using the imaging system architecture 200. The example multi-camera system includes a first camera 602 and a second camera 604, and a radar depth sensor 606. The first camera 602 acts as a reference camera that has a fixed geometric relationship with the radar unit 606; distance between them and relative angular rotation between their fields of view are known and fixed. Moreover, the first (reference) camera 602 and the radar unit 606 are geometrically co-registered: the first camera 602 is calibrated to estimate the 3D coordinates of objects appearing in a scene and can have the same 3D frame of reference as the radar unit 606. For example, the first camera 602 and the radar unit 606 can be located on a single circuit module.

Figure 6B:
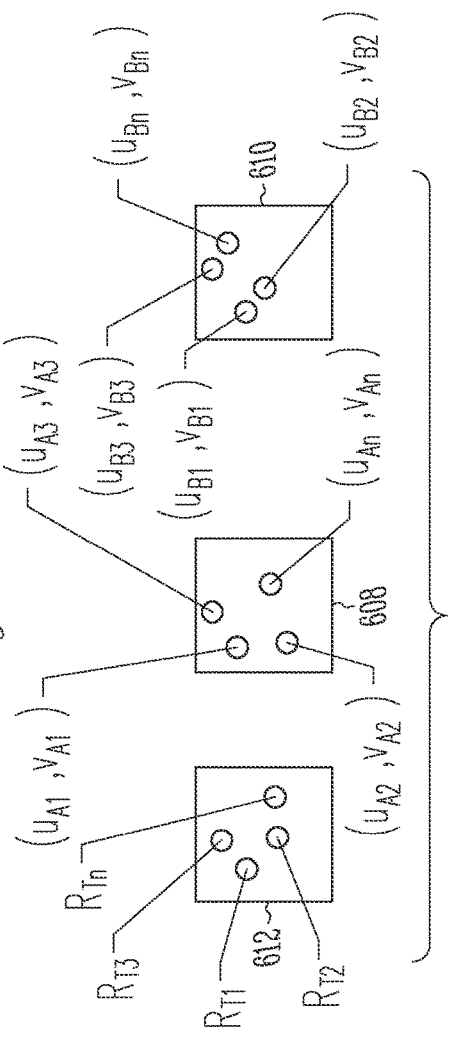
FIG. 6B is an illustrative example drawing showing regions of interest in the first and second camera and in the radar fields of view.

FIG. 6B is an illustrative example drawing showing regions of interest in the first and second camera and in the radar fields of view. More specifically, the first camera 602 includes a first image plane 608. The second camera includes a second image plane 610. The radar unit 606 includes a radar field of view 612.

Referring to FIGS. 6A-6B, in operation, multiple respective 3D world objects $O_1$, $O_2$, $O_3$, and $O_n$ are within respective FOVs of the first camera 602, and the second camera 604, and the radar unit 606. The first camera 602 captures respective object image information at coordinates $(u_{A1}, v_{A1})$, $(u_{A2}, v_{A2})$, $(u_{A3}, v_{A3})$, and $(u_{An}, v_{An})$ coordinates within the first image plane 608 corresponding to the respective objects). The second camera 604 captures object image information at $(u_{B1}, v_{B1})$, $(u_{B2}, v_{B2})$, $(u_{B3}, v_{B3})$, and $(u_{Bn}, v_{Bn})$ coordinates within the second image plane 910. The radar unit 606 captures radar information indicating target regions of interest, $R_{T1}$, $R_{T2}$, $R_{T3}$, and $R_{Tn}$ within the radar field of view 612 The radar information includes radar metadata, such as distance, speed, trajectory, and angle, for example.

Figure 7:
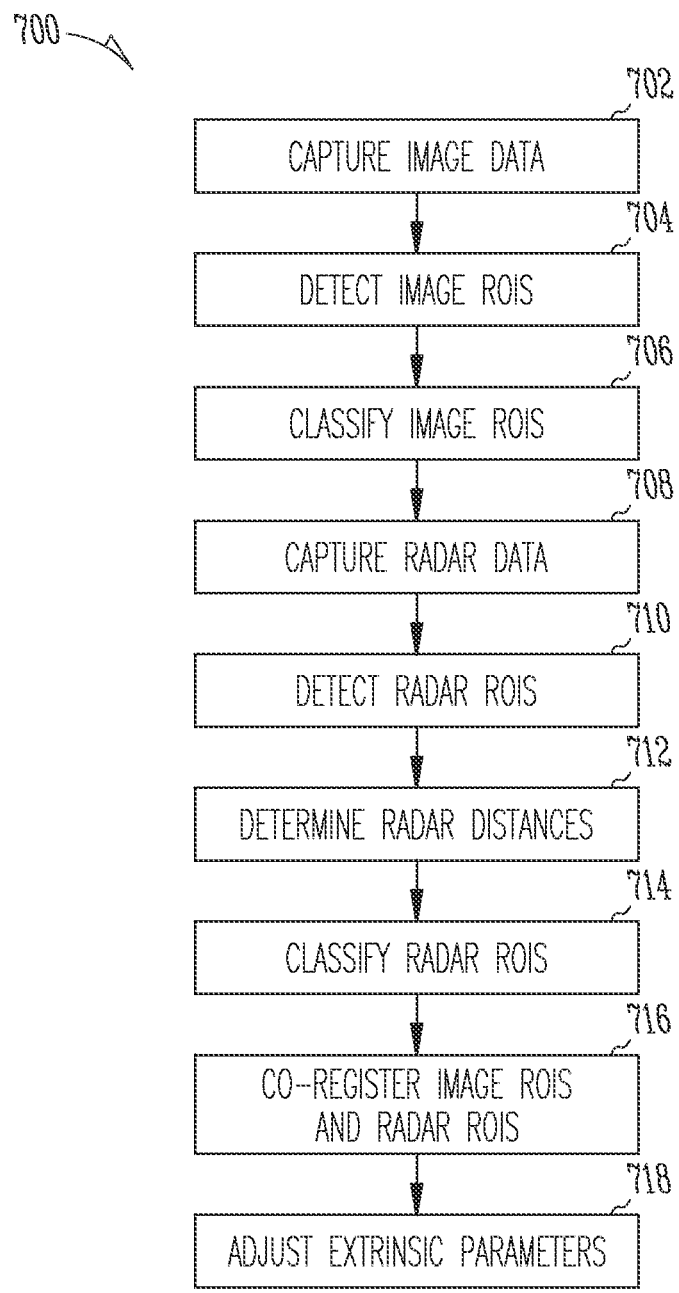
FIG. 7 is an illustrative flow diagram representing an example process to calibrate the first and second cameras of FIG. 6.

FIG. 7 is an illustrative flow diagram representing an example process 700 to calibrate the first and second cameras 602, 604. The process 700 can run using instructions stored in one or more storage devices to configure one or more processing devices of the imaging system architecture 200. Step 702 captures first image data by the first camera 602 and captures second image data by the second camera 604. Step 704 detects image ROIs within the first and second image data of the first and second cameras. Step 706 uses a first trained machine learning engine to classify image ROIs within first image data of the first camera 602 based upon 3D world objects corresponding to the image ROIs. Step 708 captures radar data by the radar unit 606 from the radar data FOV 612. Step 710 detects radar ROIs within the radar data. Step 712 determines radar distances to associate with the radar ROIs. Step 714 uses a second trained machine learning engine to classify the radar ROIs based upon 3D world objects corresponding to the radar ROIs. Step 716 matches image ROIs captured by the first camera 602 with radar ROIs that correspond to common 3D world objects to determine co-registered ROI pairs.

Step 718 adjusts geometric parameters of the camera system based upon co-registered ROI pairs and associated radar-determined 3D world distances. More specifically, in step 718 an example first fit process uses a generalized least-squares fit process, for example, to adjust first geometric parameters represented by a first matrix function M1 associated with the first camera 602, based upon projections identified using co-registered ROI pairs and corresponding radar-determined 3D world distances. Next, an example second fit process uses a generalized least-squares fit process, for example, to adjust second geometric parameters represented by a second matrix function M2 associated with the second camera 604, based upon the adjusted first geometric parameters M1.

An example first transformation matrix function M1 can include one or more matrices that include intrinsic (photometric) parameters and geometric parameters of first camera having scale S, to transform coordinates $(u_A, v_A)$ in a camera plane of first camera, to 3D world coordinates (X, Y, Z).

$$S*(u_A,v_A)*M1=(X,Y,Z) \quad (6)$$

An example second transformation matrix function M2 includes one or more matrices that include intrinsic parameters and geometric parameters of second camera having scale S, to transform coordinates $(u_B, v_B)$ in a camera plane of second camera, to coordinates (X, Y, Z).

$$S*(u_B,v_B)*M2=(X,Y,Z) \quad (7)$$

In an example imaging system, scale S is the same for both the first and second cameras, although an alternative example imaging system, different cameras can have different scales. An example transformation between first camera coordinates and second camera coordinates can be determined as follows, $$(u_B,v_B)=((u_A,v_A)*M1)*inv(M2) \quad (8)$$

The following Table 2 sets forth a set of example projections used during the example first fit process based on equation (6).

TABLE 2

| |
|---|
| $(u_{A1}, v_{A1}) * M1 = (X_1, Y_1, Z_{1R})$ |
| $(u_{A2}, v_{A2}) * M1 = (X_2, Y_2, Z_{2R})$ |
| $(u_{A3}, v_{A3}) * M1 = (X_3, Y_3, Z_{3R})$ |
| ... |
| $(u_{An}, v_{An}) * M1 = (X_n, Y_n, Z_{nR})$ |

Table 2 shows multiple example projections each involving the first transformation matrix function M1. The first example fit process adjusts geometric parameters within M1 to fit the above example image projections. Specifically, for example, the geometric parameters of M1 are adjusted to fit the projection between $(u_{A1}, v_{A1})$ and $(X_1, Y_1, Z_{1R})$, which both correspond to a first common 3D world object; to fit the projection between $*(u_{A2}, v_{A2})$ and $(X_2, Y_2, Z_{2R})$, which both correspond to a second common 3D world object; to fit the projection between $(u_{A3}, v_{A3})$, which both correspond to a third common 3D world object and $(X_3, Y_3, Z_{3R})$; and to fit the projection between $(u_{An}, v_{An})$ and $(X_n, Y_n, Z_{nR})$, which both correspond to an nth common 3D world object. Adjustment of the geometric parameters can start from an initial pose setting such as an initial estimate on height and angle could be measure during setup, for example.

The following Table 3 sets forth a set of example transformations used during the example second fit process based on equations (6), (7), (8).

TABLE 3

| |
|---|
| $(u_{B1}, v_{B1}) = ((u_{A1}, v_{A1}) * M1) * inv(M2)$ |
| $(u_{B2}, v_{B2}) = ((u_{A2}, v_{A2}) * M1) * inv(M2)$ |
| $(u_{B3}, v_{B3}) = ((u3_1, v_{A3}) * M1) * inv(M2)$ |
| ... |
| $(u_{Bn}, v_{Bn}) = ((u_{An}, v_{An}) * M1) * inv(M2)$ |

Table 3 shows multiple example projections each involving the first transformation matrix function M1 and the second transformation matrix function M2. The example second fit process uses the adjusted matrix M1 to adjust geometric parameters of M2. Specifically, for example, the geometric parameters of M2 are adjusted to fit the transformation between $(u_{B1}, v_{B1})$ and $(u_{A1}, v_{A1})$; to fit the transformation between $(u_{B2}, v_{B2})$ and $(u_{A2}, v_{A2})$; to fit the transformation between $(u_{B3}, v_{B3})$ and $(u_{A3}, v_{A3})$; and to fit the transformation between $(u_{Bn}, v_{Bn})$ and $(u_{An}, v_{An})$. Adjustment of the geometric parameters can start from an initial pose setting such as an initial estimate on height and angle could be measure during setup, for example.

First camera can be calibrated with adjusted matrix function M1. Second camera can be calibrated with adjusted matrix function M2. The calibrated cameras can be used together to infer spatial relationships with objects in the 3D world.

Figure 8:
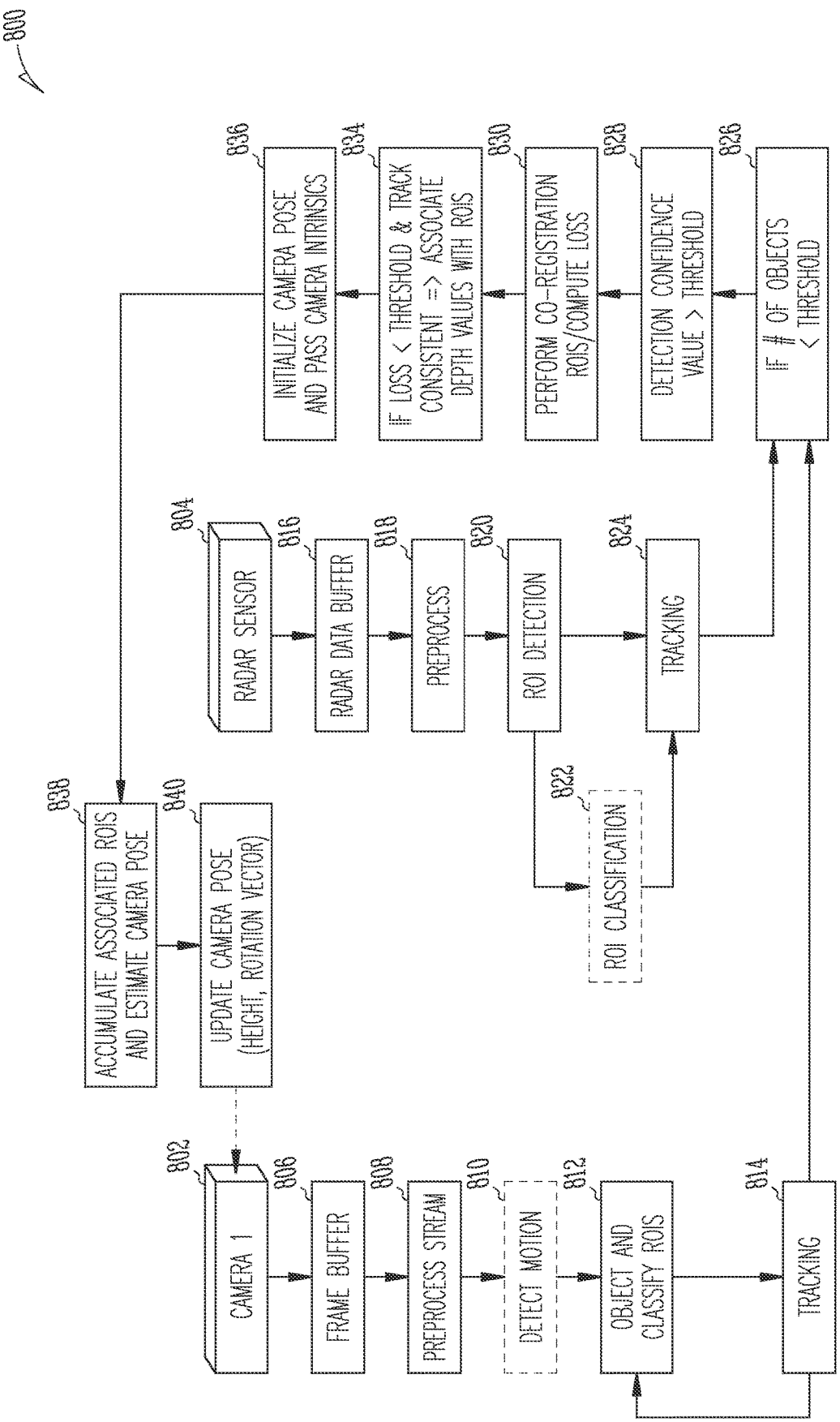
FIG. 8 is an illustrative schematic block diagram of an example imaging system with radar-based single camera calibration based upon moving objects.

Imaging System with Depth Sensor-Based Single Camera Calibration Based Upon Moving Objects FIG. 8 is an illustrative schematic block diagram of an example imaging system 800 with radar-based single camera calibration based upon moving objects. The imaging system 800 includes a camera 802, a radar unit 804, and a computing machine described below with reference to FIG. 12, including one or more processor devices configured to operatively couple to one or more non-transitory storage devices that store instructions to configure the processing devices to perform the block functions described as follows. The camera 802 captures 2D image information at a camera image plane (not shown) from a 3D world scene within a camera field of view (FOV). A frame buffer block 806 saves the camera image information in a sequence of camera image frames. An image data preprocessing stream block 808 preprocesses the image frames to produce visual images. A motion detection block 810 detects object motion to identify image ROIs within the image information. An example motion detection block 810 can use an optical flow algorithm to detect image motion. An image classification block 812 classifies image ROIs into one of several category values (for example, is this object a person, an animal, a vehicle, etc.) and produces corresponding image classification confidence scores. An example image classification block 812 can use deep learning CNN-based algorithms to perform classification. More particularly, an example classification block can use deep learning CNN-based algorithms such as Single Shot Detector that can perform detection and classification at the same time. Multiple moving objects may be identified and classified based upon image information captured within a camera FOV. An image tracking block 814 tracks classified image ROIs corresponding to objects within the camera FOV, over time. An example image tracking block 814 tracks image ROIs that correspond to object images. More particularly, an example image tracking block 814 tracks for each moving object image: a corresponding image ROI; an object image track identifier (image track ID); and an object image class and associated confidence score.

The radar unit 804 captures radar information within a radar FOV. A radar data buffer block 816 saves the radar data in a sequence of radar frames. A radar data preprocessing block 818 preprocesses the radar frames to produce radar metadata, such as distance, speed, trajectory, and angle, for example. Radar preprocessing may include computing a range, a velocity, or an angle of the moving entity using a fast Fourier transform (FFT), for example. A radar ROI detection block 820 detects radar ROIs within the captured radar information that correspond to 3D world objects within the radar FOV. A radar ROI classification block 822 classifies moving objects corresponding to detected radar ROIs into one of several category values (e.g., person, animal, vehicle, etc.) and produces corresponding radar classification confidence scores. More specifically, an example ROI classification block 822 uses Deep learning models based on Recurrent neural networks to classify radar ROIs. Multiple moving objects may be identified and classified based upon radar information captured within the radar FOV. A radar tracking block 824 tracks radar ROIs over time. An example radar tracking block 824 tracks multiple moving radar ROIs. More particularly, an example radar tracking block 824 tracks for each radar target object: a corresponding radar ROI; a radar object track identifier (radar track IDs); radar object metadata (e.g., radar depth): and radar object class and associated confidence score.

A first filter block 826 conditions adjustment of geometric parameters upon a threshold count of co-registered ROI pairs. An example first filter block 826 can delay calibration in response to too many co-registered ROI pairs being tracked because with too many objects, there can be a higher likelihood of error in co-registration. An example threshold count can be selected based upon how far these objects are from each other; the closer the objects, the lower the count. Alternatively, a threshold count can be determined based upon depends how sparse the scene is; the sparser the scene, the higher the count. In a crowded scene, for example, with many objects in the background of the scene, greater care can be required with image reflections, and it may be necessary to limit to matching one moving object at a time. In a less crowded scene, for example, it can be possible to match two or three moving objects at a time if they are far enough from each other.

A second filter block 828 conditions adjustment of geometric parameters upon co-registered ROI pairs meeting a threshold confidence level. An example second filter block 828 can prevent use of co-registered ROI pairs that do not meet the threshold confidence level. In an example imaging system 800, a threshold confidence level is selected to minimizes a false positive rate. For example, in an example system 800, a confidence level greater than 0.8 (>0.8), in a 0-1 confidence scale, can be used. In an example system, confidence is a measure of Euclidean distance between ROIs. Loss is low when the two ROIs are close in this Euclidean space.

A third filter block 830 determines whether co-registered ROIs meet a loss threshold. More particularly, an example third filter block 830 can determine whether a z-distance measured using the camera 802 for an image ROI and a z-distance measured using the radar unit 804 for a radar ROI registered to the image ROI meet a distance loss threshold. An example third filter block 830 also determines whether tracking trajectory consistency as between image ROIs and radar ROIs of co-registered ROI pairs meet a prescribed tracking loss threshold. In an example imaging system 800, a loss threshold can be determined based upon a predefined distance resolution. An example third filter block 830 can have a distance resolution for z-direction and tracking that is in a range of a few centimeters, for instance. Co-registered ROI pairs that do not meet the loss threshold requirements are excluded from use during adjustment of geometric parameters.

Depth assignment block 834 associates radar-determined depths to co-registered ROIs pairs that meet the loss threshold. More particularly, block 834 assigns to a co-registered ROI pair, a radar-determined depth associated with the radar ROI of the pair. An initialization block 836 sets an initial estimate of the camera geometric pose parameters, e.g., height and rotation. Calibration block 838 produces adjusted geometric parameters based upon co-registered image/radar ROIs and corresponding radar metadata. An example calibration block 838 can adjust geometric parameters according to the projection fitting process described with reference to Table 1. A camera update block 840 provides the adjusted geometric parameters to the camera 802.

Figure 9:
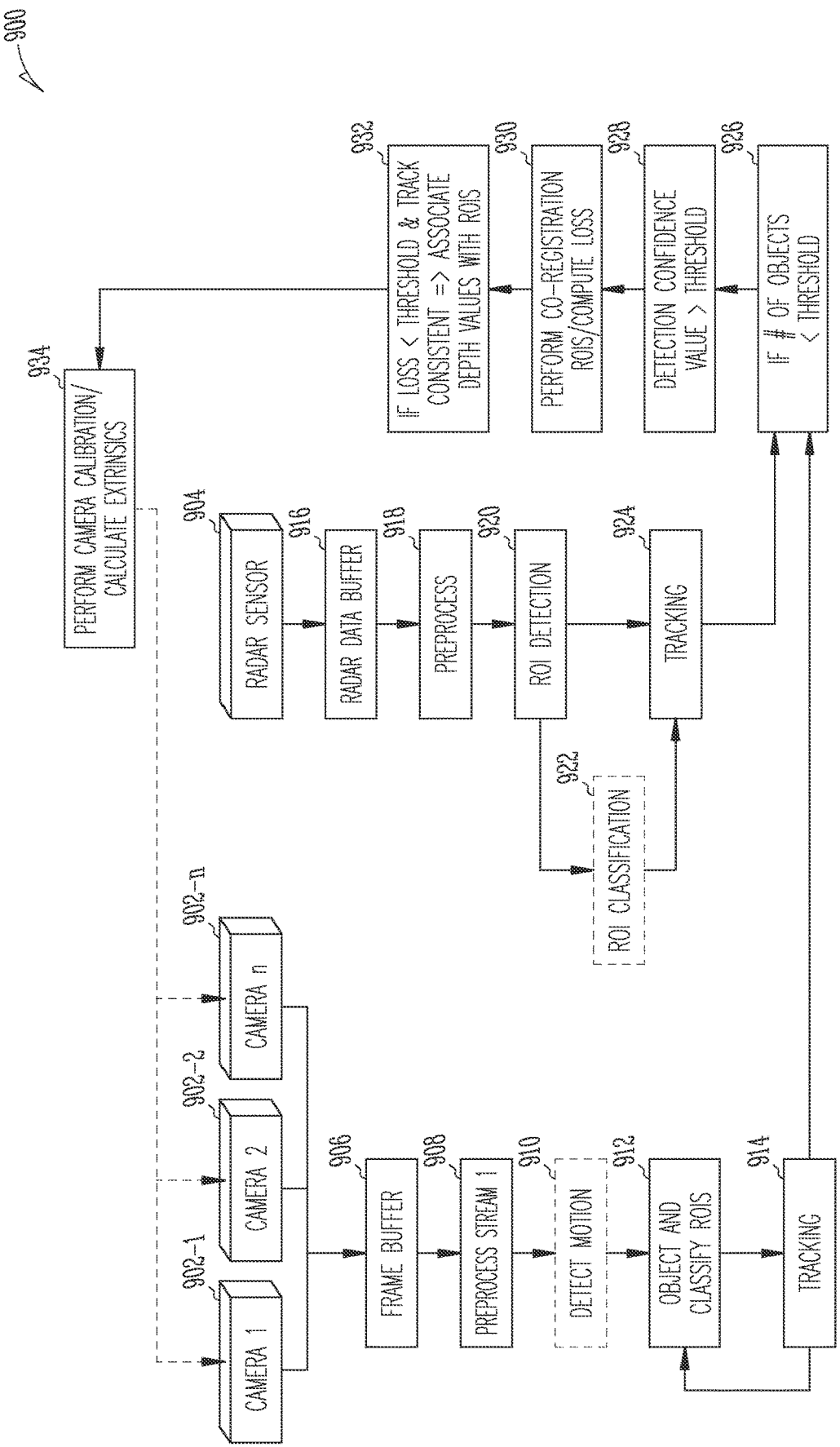
FIG. 9 is an illustrative schematic block diagram of an example imaging system with radar-based multi-camera calibration based upon moving objects.

Imaging System with Depth Sensor-Based Multi-Camera Calibration Based Upon Moving Object FIG. 9 is an illustrative schematic block diagram of an example imaging system 900 with radar-based multi-camera calibration based upon moving objects. The imaging system 900 includes multiple cameras 902-1, 902-2, . . . 902-n, a radar unit 904, and a computing machine described below with reference to FIG. 12, including one or more processor devices configured to operatively couple to one or more non-transitory storage devices that store instructions to configure the processing devices to perform the block functions described as follows. Each camera 902-1, 902-2, . . . 902-n captures image information at a corresponding camera plane (not shown). A frame buffer block 906 saves respective camera image information for each camera in a respective sequence of camera image frames. An image data preprocessing stream block 908 preprocesses the image frames to produce image metadata. A motion detection block 910 detects object motion to identify image (ROIs) within the captured image information. An image classification block 912 classifies image ROIs into one of several category values and produces corresponding image classification confidence scores. An example image classification block 912 can use deep learning CNN-based algorithms to perform classification. More particularly, an example classification block can use deep learning CNN-based algorithms such as Single Shot Detector that can perform detection and classification at the same time. Multiple moving objects may be identified and classified based upon image information captured within the multiple camera FOVs. An image tracking block 914 tracks image classified image ROIs corresponding to objects within camera FOVs, over time. More particularly, an example image tracking block 914 tracks for each object image: a corresponding image ROI; an image object track identifier (image track ID); and an image object class and corresponding confidence score.

The example imaging system 900 further includes a radar unit 904 to capture radar data, a radar data buffer block 916, a radar data preprocessing block 918, a radar ROI detection block 920, a radar ROI classification block 922, and a radar tracking block 924, which are similar to those described above with reference to FIG. 8 and the imaging system 800, and which will be understood by persons skilled in the art from the above description. The image system 900 also includes a first filter block 926, a second filter block 928, an ROI matching block 930, and a third filter block 932, which are similar to those described above with reference to the imaging system 800. For economy of description, blocks in the imaging system 900 that are similar to corresponding blocks in the imaging system 800 are not described again.

A calibration block 934 to produces adjusted geometric parameters based upon co-registered image/radar ROIs and corresponding radar metadata. An example calibration block 934 can adjust geometric parameters according to a projection fitting process and a transformation process similar to those described with reference to Tables 2 and 3, respectively. The calibration block provides the adjusted geometric parameters to the multiple camera 902-1 to 902-n.

Figure 10:
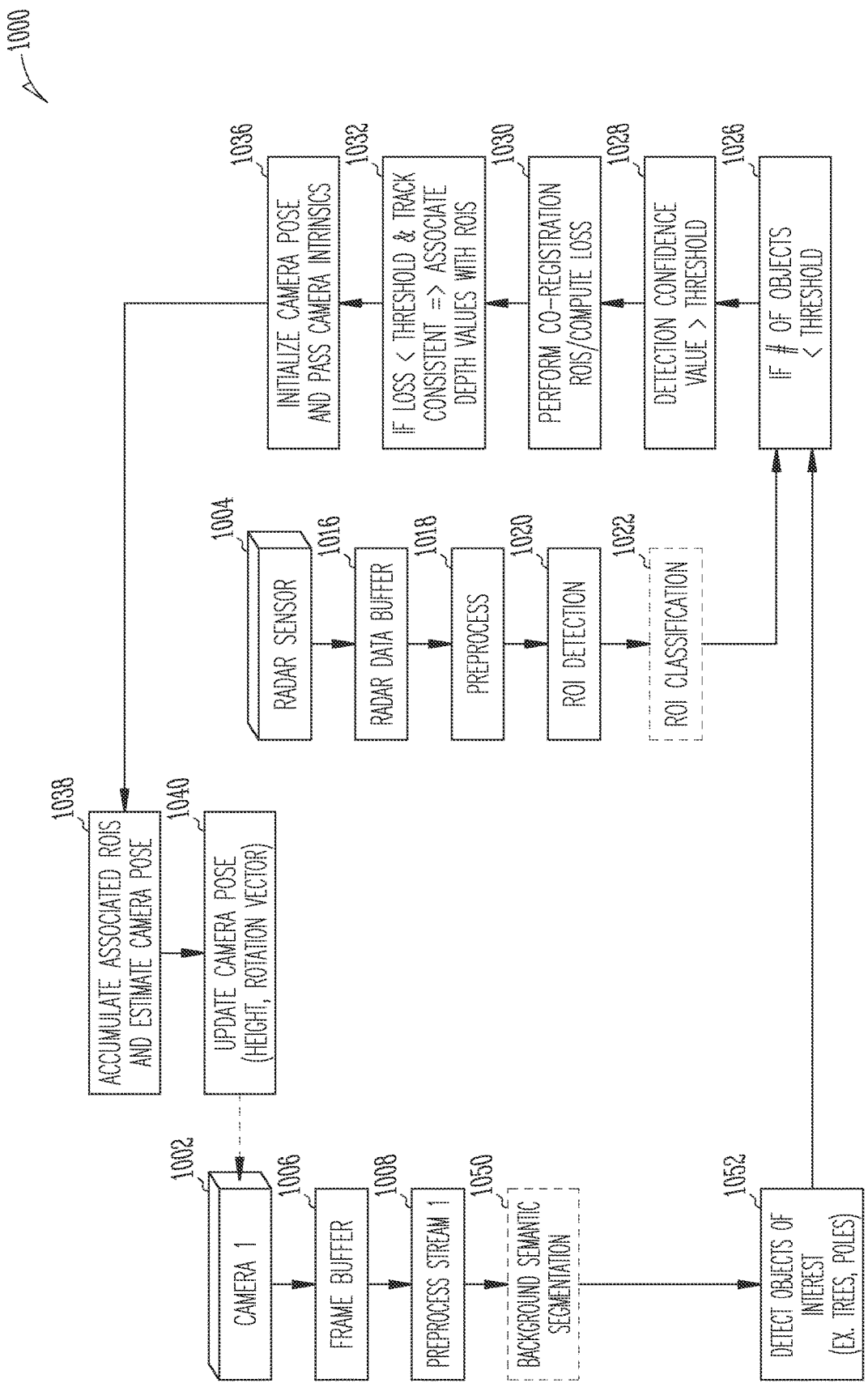
FIG. 10 is an illustrative schematic block diagram of an example imaging system with radar-based single camera calibration based upon static objects.

Imaging System with Depth Sensor-Based Single Camera Calibration Based Upon Static Objects FIG. 10 is an illustrative schematic block diagram of an example imaging system 1000 with radar-based single camera calibration based upon static objects. For economy of description, blocks in the imaging system 1000 that are similar to corresponding blocks in the imaging system 800 of FIG. 8 are not described again. A background segmentation block 1050 performs semantic segmentation to assign a classification to each pixel within the sequence of image frames. More specifically, a class is assigned to each pixel in the captured image information. An object detection and classification block 1052 detects individual ROIs within the classified pixel information. An example image classification block 1052 can use deep learning CNN-based algorithms to perform classification. More particularly, an example classification block can use deep learning CNN-based algorithms such as Single Shot Detector that can perform detection and classification at the same time. For each classified ROI, the object detection and classification block 1052 provides to the first filter 1026 a corresponding image ROI, an object image class, and associated confidence score. For each classified ROI, the radar ROI classification block 1022 provides to the first filter 1026 a corresponding image ROI, a distance value per radar ROI, an object image class, and an associated confidence score.

Figure 11:
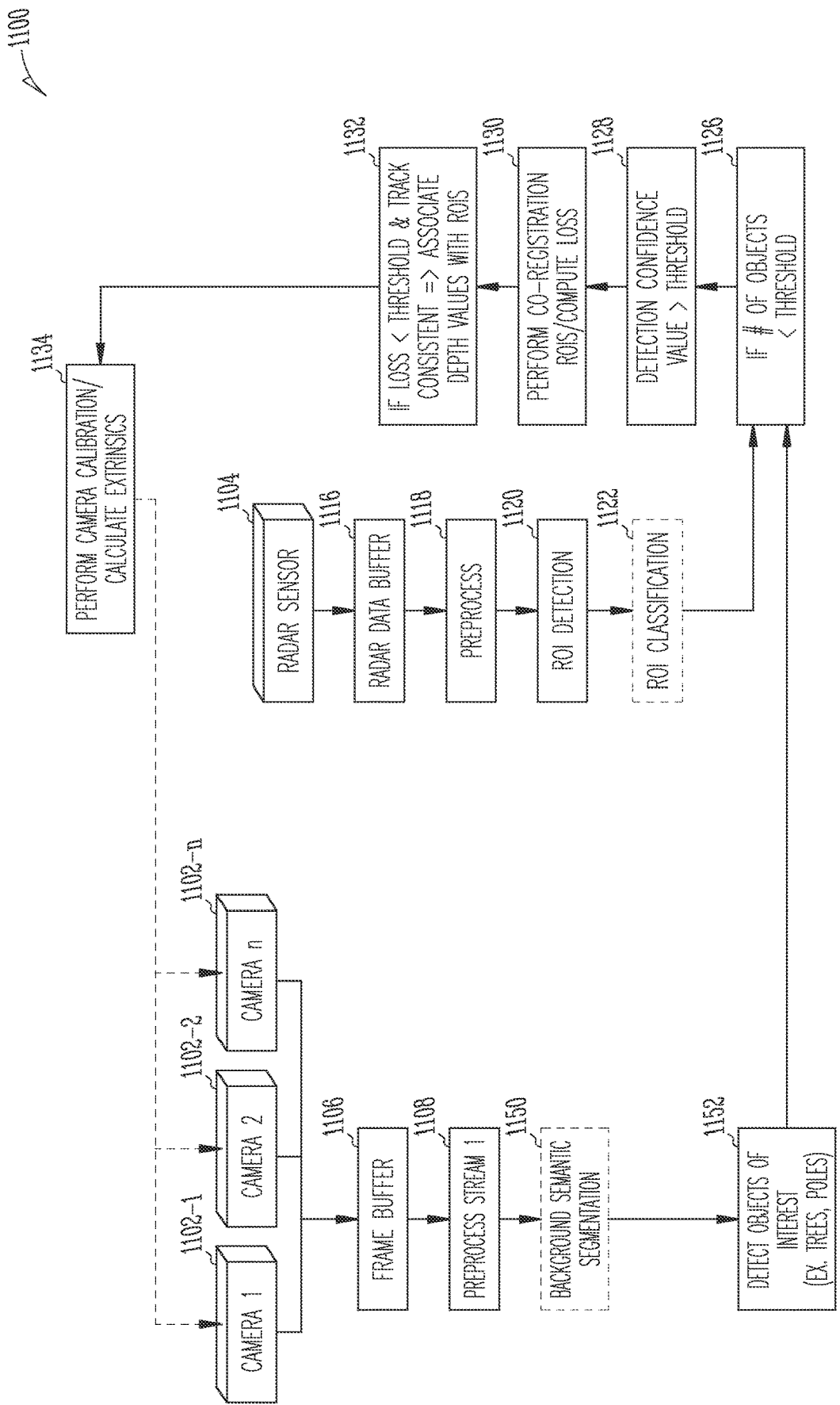
FIG. 11 is an illustrative schematic block diagram of an imaging system with radar-based multi-camera calibration based upon static objects.

Imaging System with Depth Sensor-Based Multi-Camera Calibration Based Upon Static Objects FIG. 11 is an illustrative schematic block diagram of an imaging system 1100 with radar-based multi-camera calibration based upon static objects. For economy of description, the individual blocks of the imaging system 1100 are not described again. It is noted that blocks of the fifth system correspond to blocks of the imaging system 900 of FIG. 9 except for a background segmentation block 1150 and an object detection block 1152, which correspond to similar blocks in the imaging system 1000 of FIG. 10. Thus, persons skilled in the art will understand the imaging system 1100 based upon the above descriptions of the imaging systems 900 and 1100.

Calibration of Photometric Camera Parameters

Figure 12A:
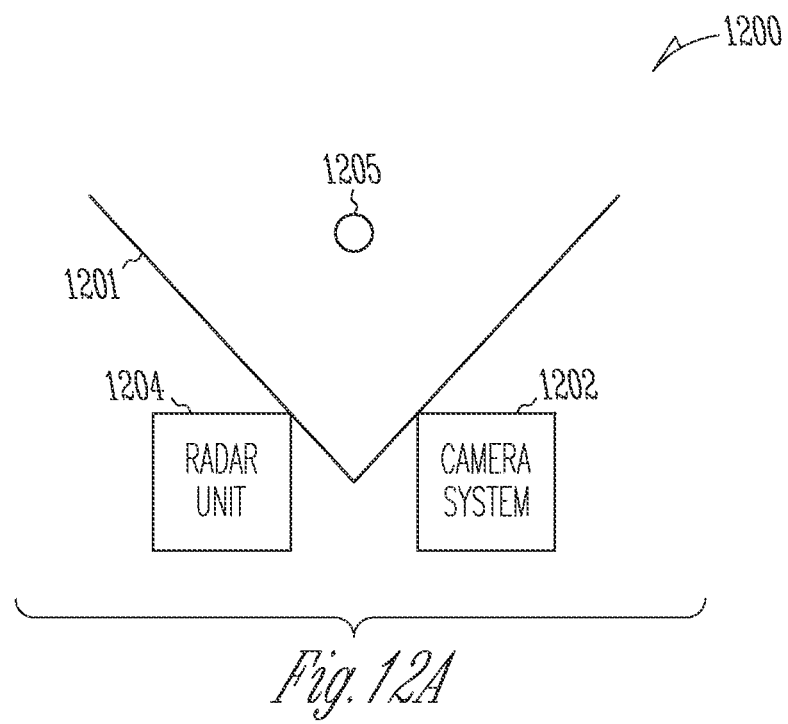
FIG. 12A is an illustrative drawing showing an example imaging system with depth sensor-based camera calibration that includes a shared field of view of a camera and a radar unit in accordance with some embodiments.
Figure 12B:
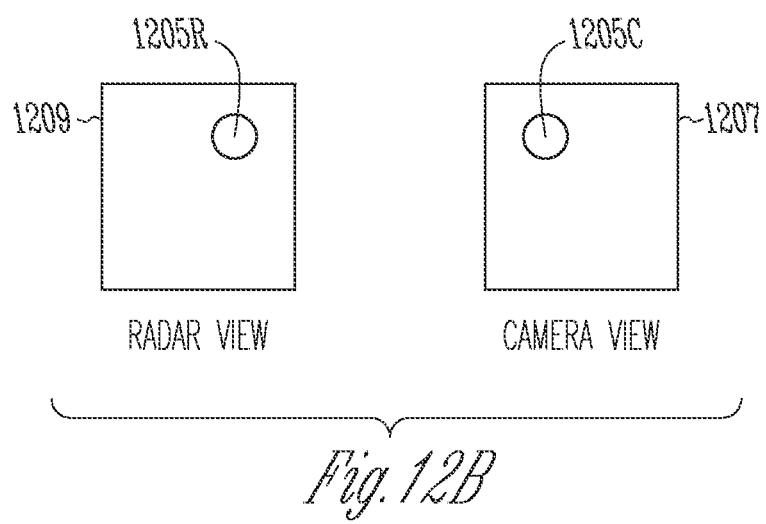
FIG. 12B is an illustrative drawing showing a camera-detected object view visible a camera view and a radar-detected object view visible within a camera view.

FIG. 12A is an illustrative drawing showing an example imaging system 1200 with depth sensor-based camera calibration that includes a shared field of view 1301 of a camera 1202 and a radar unit 1204, in accordance with some embodiments. As shown, both the camera 1202 and the radar unit 1204 observe the field of view 1201 at the same time. The camera 1202 and the radar unit 1204 can be geometrically aligned to share a common frame of reference as described above with reference to the embodiments of FIG. 2, for example. A 3D world object 1205 is visible within the FOV 1201 to both the camera 1202 and the radar unit 1204. FIG. 12B is an illustrative drawing showing a camera-detected object view 1205C visible, a camera view 1207 and a radar-detected object view 1205R visible within a camera view 1209.

Figure 13:
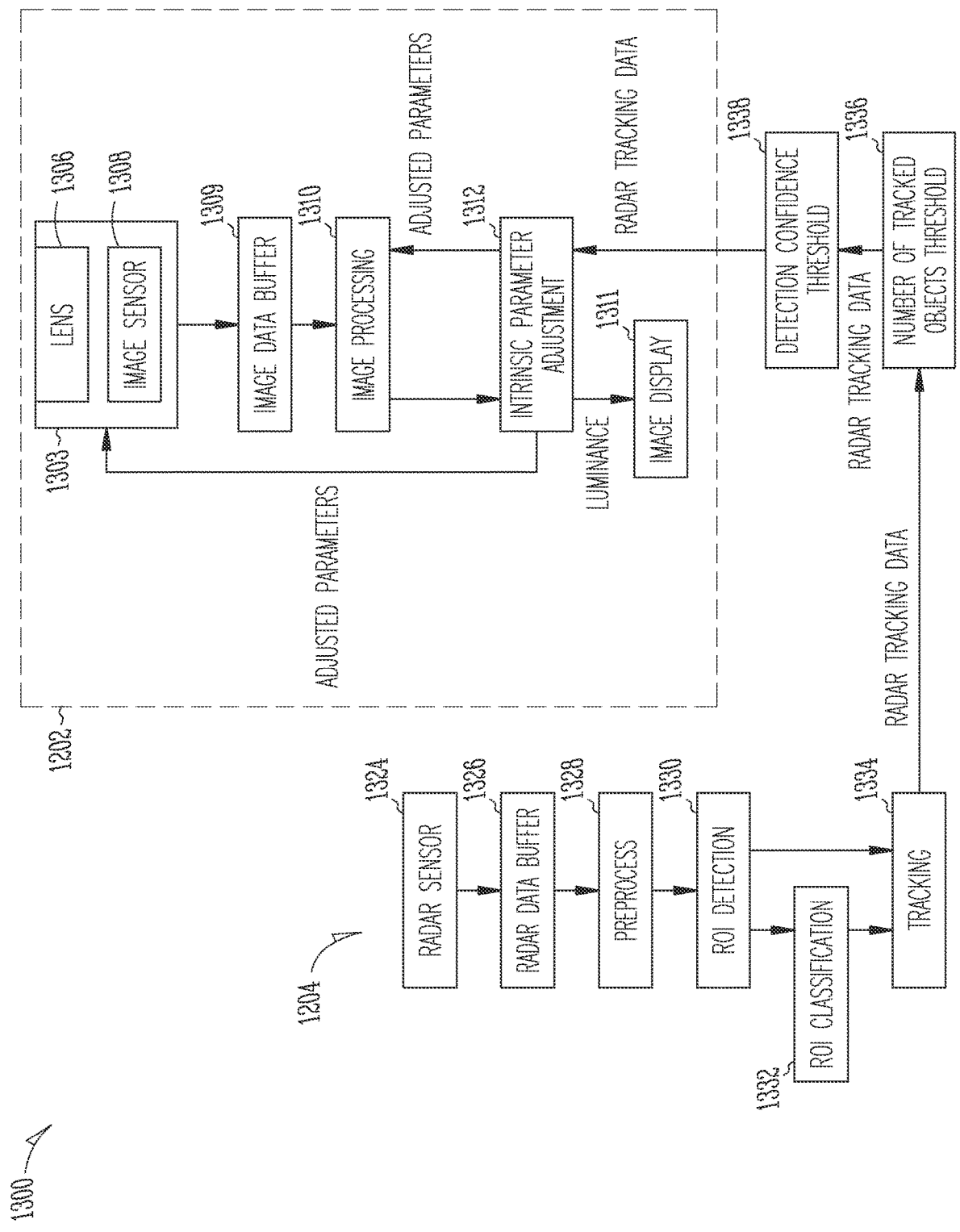
FIG. 13 is an illustrative schematic block diagram showing additional details of the imaging system of FIG. 12A.

FIG. 13 is an illustrative schematic block diagram showing additional details of the imaging system 1200 of FIG. 12A. The imaging system 1200 includes the camera system 1202, and the radar unit 1204, and a computer system, including one or more processor devices configured to operatively couple to one or more non-transitory storage devices that store instructions to configure the processing devices to perform the block functions described as follows. An example camera system 1202 operates as an image frame processing pipeline that processes a sequence of image data frames.

An example camera system 1202 includes a camera image capture unit 1303 that includes a lens system 1306 to adjust focus based upon objects within the FOV 1201 and an image sensor 1308 to capture image data for objects within the FOV 1201. An image sensor 1308 can include a CCD sensor array or can include a CMOS sensor array, for example. The camera system 1202 also includes an image frame buffer 1309, an image processing block 1310, and photometric parameter adjustment block 1312 to adjust photometric (intrinsic) camera parameters. An example adjustment block 1312 adjusts a group of photometric parameters based upon luminance determined using the image processing block 1310 and one or more of object distance, object speed and object classification determined based upon radar information captured by the radar unit 1204. A display block 1311 provides a visual display of a processed image frame.

The example camera system 1202 operates as an image frame processing pipeline that processes a sequence of image frame data and based upon the camera's intrinsic parameters. In the course of processing a current image frame in the sequence, one or more of the intrinsic parameters can be adjusted based upon luminance, radar-determined object distance, radar-determined object speed, and radar-detected object classification associated with the current frame such that a subsequent image frame in the sequence is processed using the adjusted intrinsic parameters. Adjusted intrinsic parameters are used in the processing of a subsequent image data frame in the sequence of image data frames. More specifically, for example, certain intrinsic parameters can be provided to the camera lens system 1306 to adjust focal length and to the camera image sensor 1308 to determine exposure time. Moreover, for example, certain intrinsic parameters can be provided to the image processing block 1310 to determine automatic white balance (AWB), high dynamic range (HDR) and tone map.

An example radar unit 1204 includes a radar sensor 1330 that can have single transmit/receive (Tx/Rx) units or operate as phased array or MIMO with multiple Tx/Rx units, for example, to capture radar information within the FOV 1201. A radar data buffer block 1326 saves the radar data in a sequence of radar frames. An example radar data preprocessing block 1328 preprocesses the radar frames using a fast Fourier transform (FFT) to produce radar metadata, such as distance, speed, trajectory, and angle, of the radar-detected object view (a 'radar object') 1205R. A radar ROI detection block 1330 detects radar ROIs within the captured radar information that correspond to 3D world objects within the shared FOV 1201. A radar ROI classification block 1332 classifies radar objects corresponding to detected radar ROIs into one of several category values (e.g., person, animal, vehicle, etc.) and produces corresponding radar classification confidence scores. Multiple radar objects may be identified and classified based upon radar information captured within the FOV 1201. A radar tracking block 1334 tracks radar ROIs over time. An example radar tracking block 1334 tracks multiple moving radar ROIs. More particularly, an example radar tracking block 1334 tracks for each radar object: a corresponding radar ROI; a radar object track identifier (radar track IDs); object depth per track ID, object speed per track ID and object classification associated confidence score per track ID.

An example first filter block 1336 conditions use of radar-based information to determine adjustment of intrinsic parameters upon a threshold count of tracked radar objects. An example first filter block 1336 can delay calibration in response to too many tracked objects being tracked because too many objects can increase the chance of error. More specifically, an example threshold count can be selected to minimize the chance of error. An example second filter block 1338 conditions use of radar-based information to determine adjustment of intrinsic parameters upon tracked radar objects meeting a threshold confidence level. More particularly, an example second filter block 1338 can prevent use of radar objects that do not meet a threshold confidence level based upon In an example imaging system 1300, a threshold confidence level is selected to minimizes a false positive rate. For example, in an example system 1300, a confidence level greater than 0.8 (>0.8), in a 0-1 confidence scale, can be used. In an example system, confidence is a measure of Euclidean distance between ROIs. Loss is low when the two ROIs are close in this Euclidean space. In response to one or both of the first filter block 1336 and the second filter block 1338 preventing use of certain radar-based information for intrinsic parameter adjustment, an example intrinsic parameter adjustment block 1312 can adjust values of a group of camera intrinsic parameters including 3A (AE, FA, AWB), gain, and HDR, for example, based upon luminance and based upon distance information determined using an alternative known distance measurement system, for example.

Referring again to FIGS. 12A-12B, the imaging system 1300 of FIG. 13 can be configured as described above with reference to FIG. 2, for example, to match region of interest (ROI) pairs within the camera image 1207 and within the radar image 1209. More specifically, the imaging system 1300 can be configured to match a camera-detected view of an object 1205C with radar-detected view of the object 1205R. In operation, an example camera system 1202 can select a camera-detected object within the FOV 1201 as a camera target object. Targets can be selected targets of interest such as human, animal, car that have contextual significance in a scene. For example, the camera system 1202 can identify an object in motion as described above with reference to block 810 of FIG. 8, for example, and can select the identified object in motion to be act as camera target object. The radar unit 1204 can classify and track an ROI corresponding to the camera target object as explained with reference to blocks 1330, 132, 1334 of FIG. 13. The camera system 1202 also can include blocks (not shown) to classify and track the camera target object as described with reference to blocks 812 and 814 of FIG. 8, for example. The image system 1300 can be configured with blocks (not shown) to match radar ROIs and image ROIs in co-registered ROI pairs as described with reference to block 830, for example. The camera system 1202 can be configured to associate radar-determined speed and radar-determined distance with camera target object based upon determining a co-registered ROI pair for which the camera target object corresponds to the image ROI; speed and distance associated with the radar ROI of that co-registered ROI pair are associated with the camera target object. The adjustment block 1312 can use that radar-detected distance and radar-detected speed to adjust the intrinsic parameters.

An example camera system 1202 can include a known supplementary distance measurement system (not shown), such as IR, sonic TOF, or Lidar to measure distances from a camera-detected objects 1205C ('camera objects') within the camera view 1207, for example. Thus, a known distance system can be used in addition to or in place of the radar unit 1204 to determine object distance.

Figure 14:
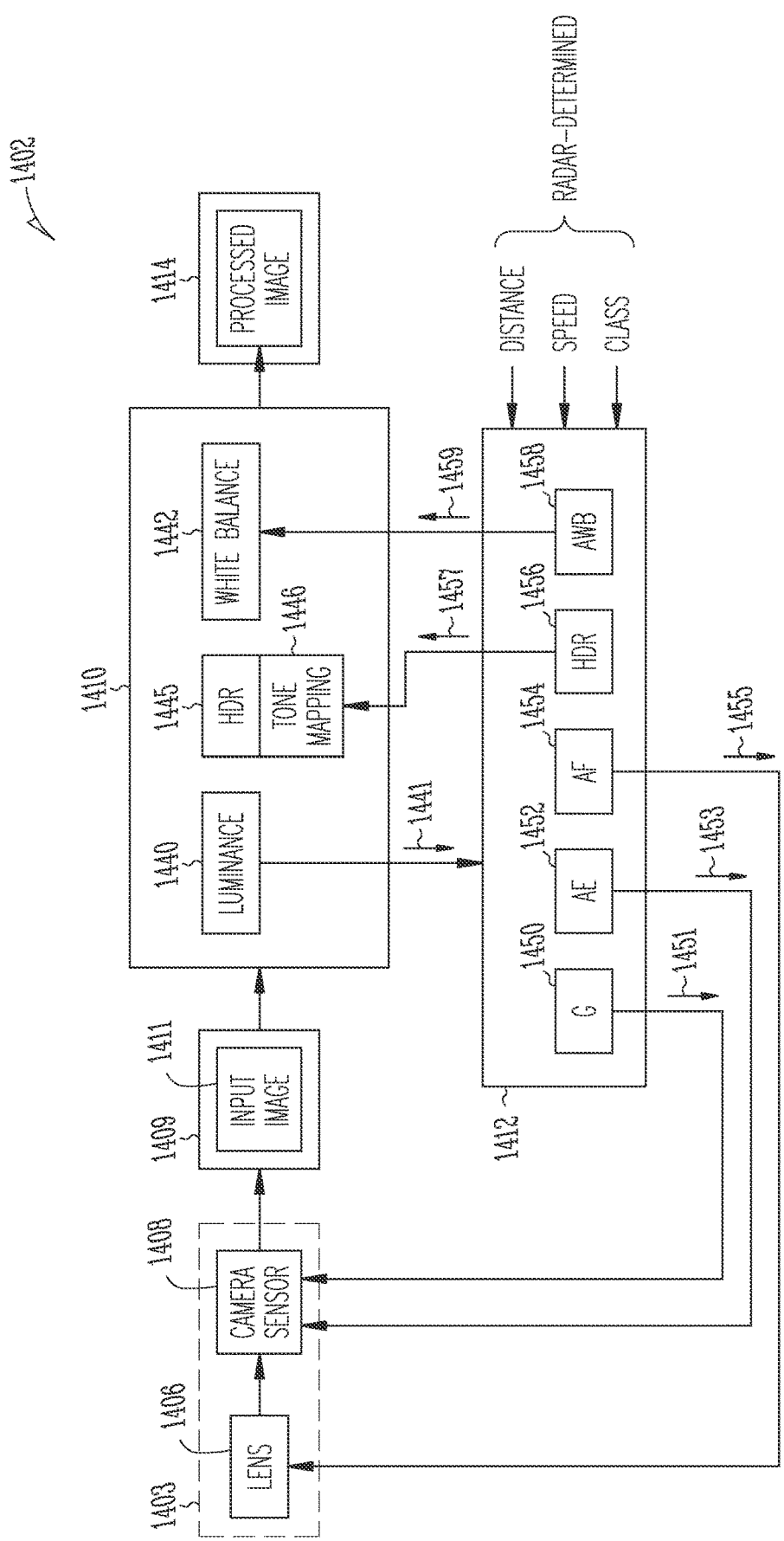
FIG. 14 is an illustrative block diagram showing certain additional details of an example camera system in accordance with some embodiments.

FIG. 14 is an illustrative block diagram showing certain additional details of an example camera system 1402 in accordance with some embodiments. The camera system 1402 includes a camera image capture unit 1403. The camera system also includes an image processing block 1410 and an intrinsic parameter adjustment block 1412 that can include a computer system, comprising one or more processor devices configured to operatively couple to one or more non-transitory storage devices that store instructions to configure the processing devices to perform image processing and intrinsic parameter adjustment as described below. An example camera image capture unit 1403 includes a lens system 1406 an image sensor 1408 that can include a pixel sensor array to capture a sequence of image data frames. The camera system 1402 also includes an image frame buffer 1409 to save a sequence of received input image data frames 1411. An example image processing block 1410 includes a luminance block 1440, a white balance block 1442, and an HDR block 1445 and associated tone mapping block 1446. An example luminance block 1440 uses known techniques to determine image luminance based upon received input image frame data. The determined luminance indicates light intensity incident upon a pixel sensor array of the image sensor 1408. An example luminance block 1440 can produce a luminance histogram, for example, to indicate light intensity distribution across a pixel sensor array the image sensor 1408. An example white balance block 1442 uses known techniques to estimate color within of a light source, e.g., light reflected from an object within the FOV 1201, and to adjust white balance within a received image data frame based upon an estimated dominant illuminant color within the image data. An example HDR block 1444 uses known techniques to render images resulting from merging multiple lower dynamic-range or standard-dynamic-range images. HDR images generally can represent a greater range of luminance levels than can be achieved using more traditional methods. An example tone mapping block 1446 uses known techniques to compress the extended luminosity range of HDR images for display on a display device 1411.

An example intrinsic parameter adjustment block 1412 produces control signals to adjust intrinsic parameters used to control luminance of images captured by the camera system 1402 and to determine camera lens focal distance, for example. An example adjustment block 1412 receives a luminance information signal from the image processing block 1410 that indicates luminance of the received image frame and a target luminance. The adjustment block 1412 also can receive object distance, object speed, and object classification information from a radar unit, such as from radar tracking block 1334 of FIG. 13, for example. An example adjustment block 1412 includes a gain control block 1450, an auto-exposure (AE) control block 1452, an auto-focus (AF) control block 1454, an AWB (auto-white balance) control block 1456, and an HDR control block 1458.

An example gain control block 1450 produces a gain control signal 1451 to control image signal gain produced by the image sensor 1408 based upon a combination of luminance information of a currently received frame determined by the luminance block 1440, and one or more of radar-determined distance, radar-determined speed and radar-determined classification corresponding to a selected camera target object. For example, if a scene is too dark as measured by total luminance, then auto-exposure time can be increased to improve brightness. Alternatively, for example, if the scene is too dark as measured by total luminance, then gain can be increased to improve brightness. Conversely, if a scene is too bright, then auto-exposure time can be decreased to improve brightness, or gain can be decreased to improve brightness. Object speed is a factor used in an example system 1402 to determine whether to adjust image brightness by adjusting auto-exposure or by adjusting gain, or a combination thereof. If an object is moving at high speed, for example, then increasing auto-exposure integration time can lead to motion blur, and consequently, in an example camera system 1402, adjusting gain can be the preferred course of action to reduce brightness of a scene that includes a high-speed object. Conversely, if object motion within a scene is slow, for example, then increasing gain can increase image noise, and consequently, increasing auto-exposure integration time can be the preferred course of action to increase brightness of a scene that includes a slow-moving object. So, the example camera system 1402 imposes a compromise or balance between gain vs auto-exposure, based upon tolerance for motion blur vs tolerance for image noise.

Moreover, an example gain control block 1450 can adjust the gain control signal 1451 based upon one or more of radar-determined classification for a selected camera target object to achieve the target luminance. An example gain control block AA40 can provide a gain signal 1441 to decrease gain in response to a selected camera target object classified as having higher reflectivity such as a car; and conversely, the gain control block AA40 can provide a gain signal 1441 to increase gain in response to a selected camera target object classified as having lower reflectivity such as a person.

An example luminance information signal 1441 provides information to determine a target luminance for a subsequent image frame. In an example camera system 1402, luminance can be computed as mean of the current luminance channel in an image frame. in YUV color space that is Y channel, in RGB color space we can compute $L=0.5*G+0.25*R+0.25*B$. There can be many different ways to compute luminance channel from RGB. In hardware, we can also use Ambinet Light Sensor (ALS), for which we can measure scene lux values to determine how dark or bright it is.

An example AE control block 1452 can produce an AE control signal 1453 to control image exposure time at the image sensor 1408 based upon a combination of luminance information of a currently received image frame determined by the luminance block 1440 and one or more of radar-determined distance, radar-determined speed and radar-determined classification of a selected camera target object. For example, An example AE block 1452 includes a metering table in which auto-exposure values can be chosen based on scene illumination measure by average luminance or lux. Longer exposure values are associated with darker scenes and lower exposure values are associated with brighter scenes. The example AE block 1452 balances between illumination, integration exposure time and gain. An object of an example AE block 1452 is to illuminate a scene by balancing objective of minimizing motion blur while limiting image noise.

An example AE control block 1452 can adjust the gain based upon one or more of radar-determined distance, radar-determined speed, and radar-determined classification for a selected camera target object to achieve the target luminance in a subsequent image frame. An image of a fast-moving target object can become blurred within an image frame if the exposure time is too long. Therefore, an example AE control block 1452 can balance a target luminance goal with a need to reduce target object image blur. An example AE control block 1452 can increase exposure time in response to a more fast-moving selected camera target object since shorter exposure time can reduce image blur. Moreover, an example AE control block 1452 can increase exposure time in response to a more distant selected camera target object since higher luminance may be required to make enhance its camera image visibility; and conversely, the AE control block 1452 can reduce exposure time in response to a close-up selected camera target object since lower luminance may be required to avoid image saturation. Furthermore, an example AE control block 1452 can decrease exposure time in response to a selected camera target object classified as having higher reflectivity; and conversely, the AE control block 1452 can reduce exposure time in response to a selected camera target object classified as having lower reflectivity.

The AF control block 1454 produces an AF control signal 1455 to control location of a focal plane of the lens system 1406. The AWB control block 1456 produces an AWB control signal 1457 to adjust processing by the white balance block 1442. The white balance block 1442 can modify white balance among pixels within a received image frame to make an output image produced using the frame to be appear more realistic or genuine to the human eye, for example. The HDR control block 1458 produces an HDR control signal 1459 to adjust processing by the HDR block 1445. In normal light conditions, AF, AWB, and HDR control signals can be produced based upon luminance information signal. However, in some environments such as low light environments, there may be insufficient luminance for a camera to detect and track an object within the field of view 1201. A camera system 1402 can be configured to operate in a radar-control mode in which radar-detected object distance, radar-detected object speed, and radar-determined classification are used to adjust one or more of gain, exposure time, focal length, HDR settings.

More particularly, an example AF block 1454 provides control signals 1455 to a lens actuator (not shown) to cause the lens 1406 to move position to bring image objects that are far or close to be in focus. An example AF block 1454 is configured to perform a search algorithm to select a focus point. With range of object of interest known based upon radar information, the AF block 1454 can cause the lens 1406 to move by an amount determined based upon the known distance, to a lens position selected to bring that object in focus. An example AWB block 1458 can control adjustment of white balance based upon ROI of object within a scene. An example AWB block 1458 follows rules similar to gain and AE for noise, and saturation. An example HDR block 1456 operates similar to the AE block 1452 and the gain block 1450. In an HDR in multi-frame scenario the HADR block 1456 is configured to minimize artifacts from fast moving objects, for example.

Figure 15:
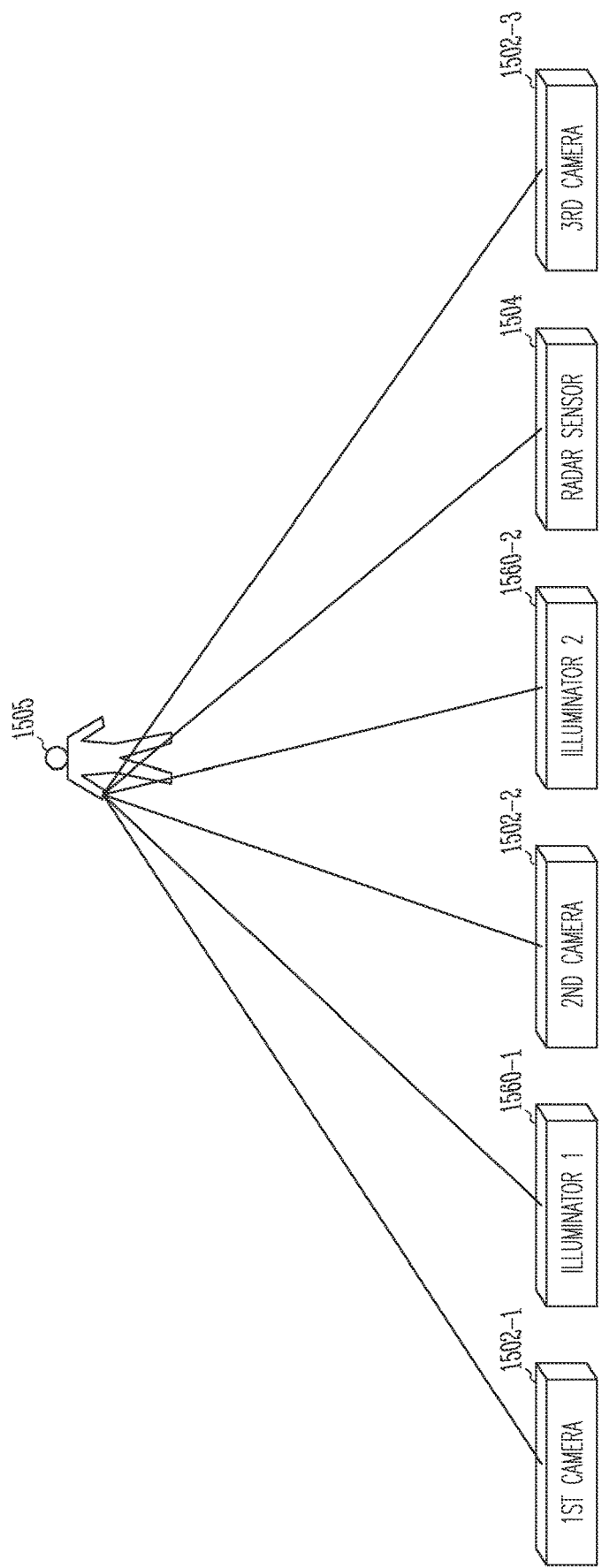
FIG. 15 is an illustrative drawing showing an example camera imaging system that includes radar tracking and camera illumination.
Figure 16:
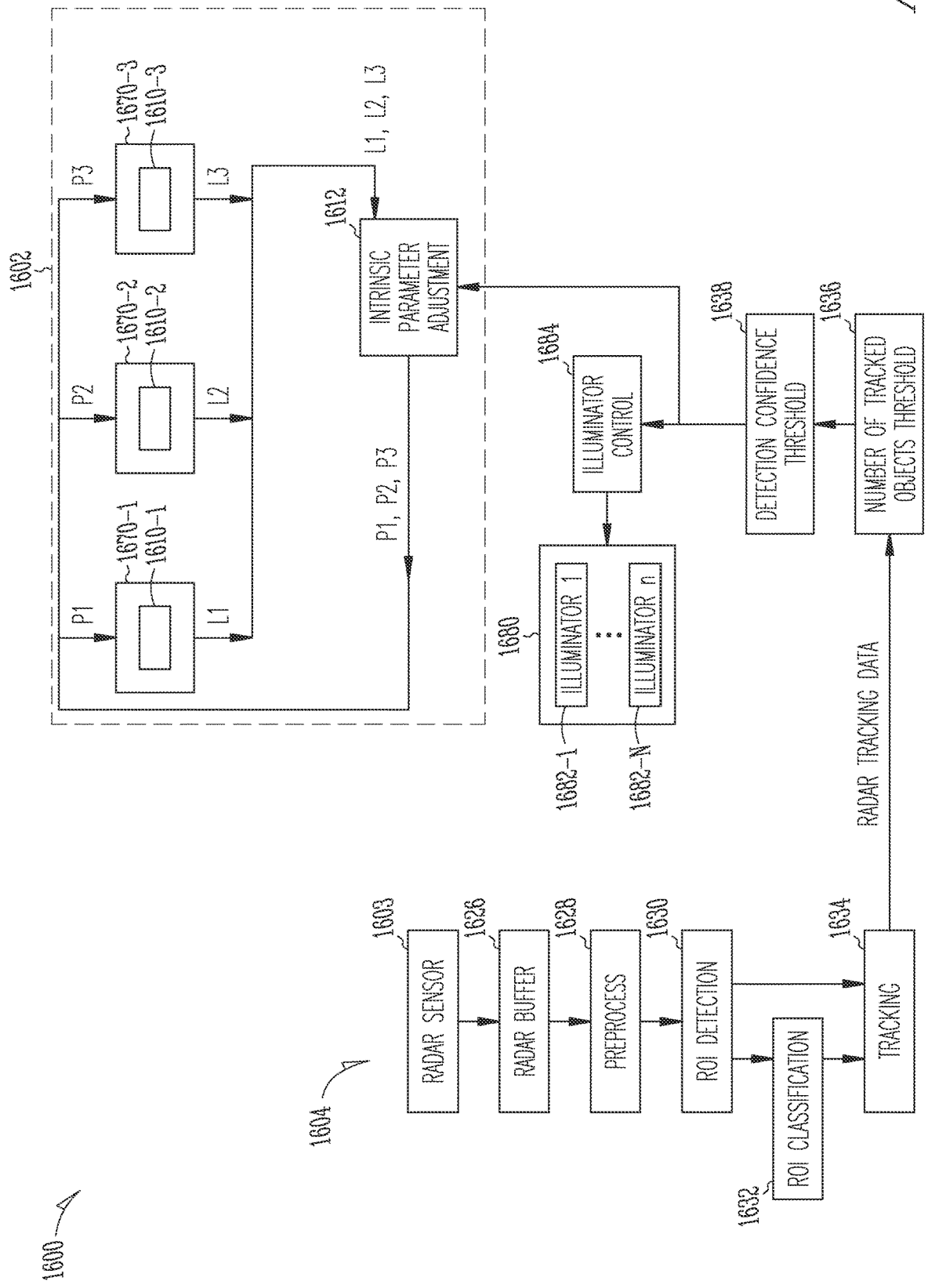
FIG. 16 is an illustrative schematic block diagram showing certain details of an example camera imaging system that includes radar tracking and camera illumination.

FIG. 15 is an illustrative drawing showing an example camera imaging system 1500 that includes radar tracking and camera illumination. The imaging system 1500 includes first, second, and third cameras 1502-1, 1502-2, 1502-3, a radar unit 1504, and first and second illumination devices 1560-1, 1560-2. The illumination devices can be visual or IR, for example, to match camera-type. 1R also can provide night vision capability. The first, second, and third cameras 1502-1, 1502-2, 1502-3 capture respective first, second, and third camera images of an object 1505. The radar unit 1504 can determine distance of the object 1505, speed of the object 1505 and a classification to associate with the object 1505. First and second illumination devices 1560-1, 1560-2 illuminate the object 1505 with a light intensity determined based upon one or more the radar-determined distance, speed, and classification. As explained above, balance illumination, exposure and gain are balanced to illuminate the scene while reducing blur and minimizing noise. FIG. 16 is an illustrative schematic block diagram showing certain details of an example camera imaging system 1600 that includes radar tracking and camera illumination. The imaging system 1600 includes ta camera system 1602, a radar unit 1604, an illumination system 1680, and a computer system described below with reference to FIG. 17, including one or more processor devices configured to operatively couple to one or more non-transitory storage devices that store instructions to configure the processing devices to perform the block functions described as follows. An example camera system 1602 includes multiple cameras 1670-1, 1670-2, 1670-3 and an intrinsic camera adjustment block 1612.

Each camera 1670-1, 1670-2, 1670-3 includes a respective lens system (not shown), a respective image sensor (not shown) and a respective image processing block 1610-1, 1610-2, 1610-3. Each camera operates as respective image frame processing pipeline that processes a respective sequence of image data frames. The cameras 1670-1, 1670-2, 1670-3 can be calibrated according to geometric parameters as described above to correlate corresponding coordinate locations in their respective pixel sensor image planes. Each camera also includes an input image data buffer (not shown).

An example adjustment block 1612 adjusts intrinsic parameters of the multiple cameras based upon respective first, second, and third luminance information L1, L2, L3 determined by first, second, and third image processing blocks 1610-1, 1610-2, 1610-3 and based upon one or both of radar-determined speed and radar-determined classification of a camera target object. An example camera system 1402 balance illumination with power conservation. In an example camera system 1402, how much illumination to use is based on the class of object. If the object requires a high resolution image, such as a human face, for example, sufficient illumination is provided to perceive the face; if on the other hand the object does not require a high resolution image, such as an animal, for example, sufficient illumination is provided to perceive the type of animal while preserving my illumination power.

More specifically, for example, the adjustment block 1612 produces respective first, second and third adjustment parameters P1, P2, P3 to adjust image capture and processing by the respective first, second and third cameras 1670-1, 1670-2, 1670-3. The first, second, and third adjustment parameters P1, P2, P3 can be determined, for example, to achieve uniform image luminance within the first, second, and third cameras. Additionally, the first, second, and third adjustment parameters P1, P2, P3 can be selected, for example, to reduce blurring of respective images of a camera target object captured by the first, second, and third cameras.

The illumination system 1680 includes multiple illumination devices 1682-1 to 1682-n that can be positioned to illuminate a scene captured by the multiple cameras 1670-1, 1670-2, 1670-3. The illumination devices can be at distributed locations so that different ones of the illumination devices are positioned to provide illumination within fields of view of different ones of the cameras. An illumination control block 1684 adjusts illumination power to provide to the different ones of the illumination devices based upon one or both of radar-determined distance and radar-determined classification of a camera target object. For instance, an example illumination block 1684 can cause higher illumination by the illumination devices 1682-1 to 1682-n in response to a camera target object that is more distant than in response to a camera tracking object that is closer. Moreover, an example illumination block 1684 can cause higher illumination by the illumination devices 1682-1 to 1682-n in response to a camera target object that is more light-reflective than in response to a camera tracking object that is less light-reflective. Furthermore, the example illumination block 1684 can cause different illumination devices to illuminate with different levels of illumination.

More particularly, for example, the illumination devices can be configured such that, if object is too far and it is of class of interest, also if the ALS or Luminance channel show low illumination, then a high illumination power setting is used for illumination of a scene. The example lamination devices are configured such that if an object is too close then a mild illumination power setting is used to avoid saturating while still sufficiently illuminating the scene so that details are perceivable to a human. The example lamination devices are configured to implement a functional control loop between distance/speed, object class, current illumination or the object (through ALS or Luminance channel) to decide how high or low to change illumination. For example, assume that radar detects a person at distance of 20 meters moving toward a zone of interest observed by the camera imaging system 1600. Assume further that the camera frames of the camera imaging system 1600 detects ROIs as very dark. In response to determining that the ROIs are dark, the camera system 1600 causes illuminator power to be set at a higher value and also adjusts 3A parameters. The camera system 1600 then checks ROI to determine whether luminance is improved. If illumination is still below an acceptable threshold illumination, then illumination can be increased further. If illumination is above an acceptable threshold, then illumination can be decreased.

The radar unit 1604 includes blocks 1603 and 1626-1638, which will be understood from the description above with reference to FIG. 13. For economy of description, the description of these blocks is not repeated.

Computing Machine

Figure 17:
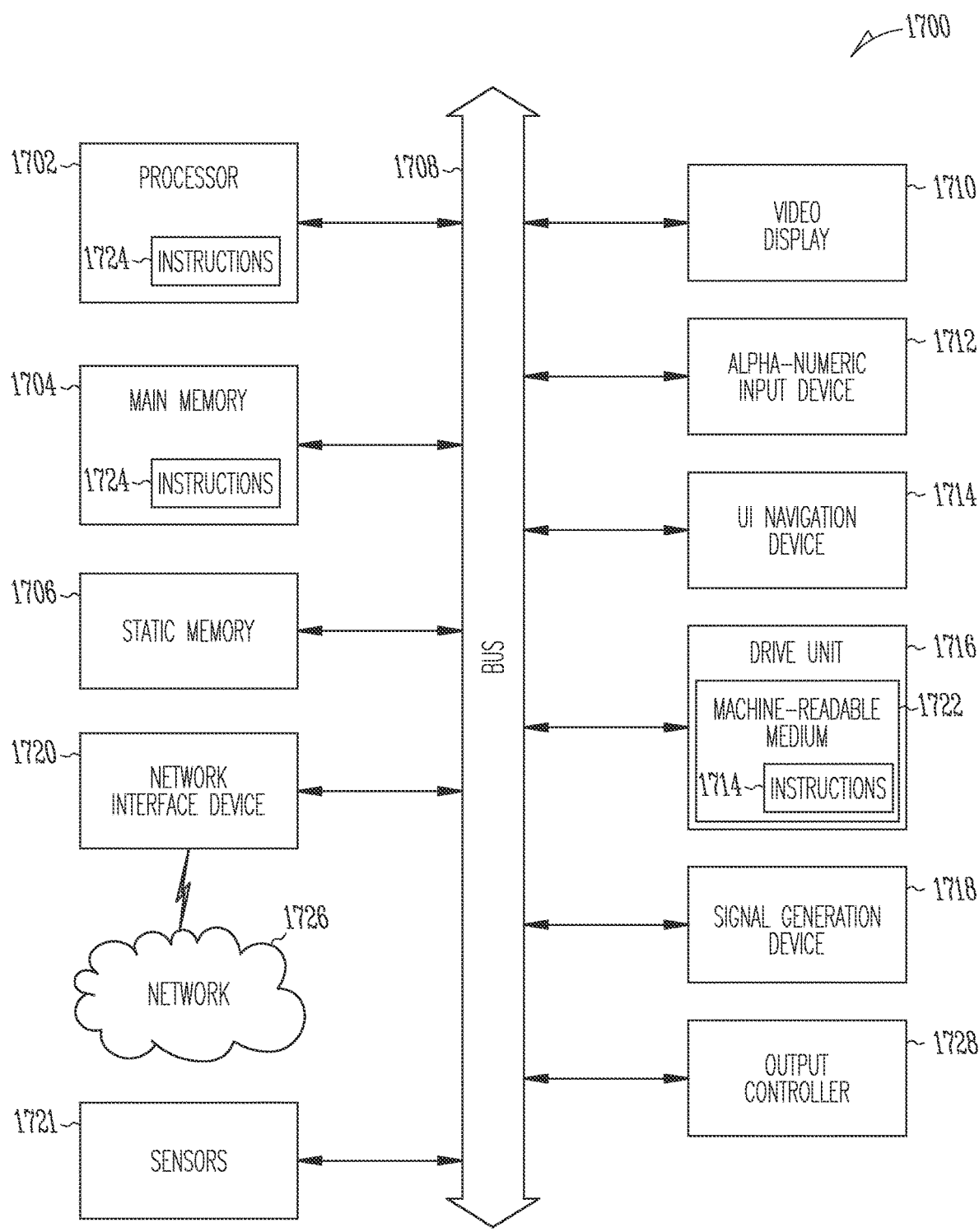
FIG. 17 is an illustrative block diagram of a computing machine in accordance with some embodiments.

FIG. 17 is an illustrative block diagram of a computing machine 1700 in accordance with some embodiments. In some embodiments, the computing machine 1700 may store the components shown in the circuit block diagram of FIG. 17. For example, circuitry that resides in the processor 1702 and may be referred to as "processing circuitry." Processing circuitry may include processing hardware, for example, one or more central processing units (CPUs), one or more graphics processing units (GPUs), and the like. In alternative embodiments, the computing machine 1700 may operate as a standalone device or may be connected (e.g., networked) to other computers. In a networked deployment, the computing machine 1700 may operate in the capacity of a server, a client, or both in server-client network environments. In an example, the computing machine 1700 may act as a peer machine in peer-to-peer (P2P) (or other distributed) network environment. In this document, the phrases P2P, device-to-device (D2D) and sidelink may be used interchangeably. The computing machine 1700 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 1700 may include a hardware processor 1702 (e.g., a central processing unit (CPU), a GPU, a hardware processor core, or any combination thereof), a main memory 1704 and a static memory 1706, some or all of which may communicate with each other via an interlink (e.g., bus) 1708. Although not shown, the main memory 1704 may contain any or all of removable storage and non-removable storage, volatile memory, or non-volatile memory. The computing machine 1700 may further include a video display unit 1710 (or other display unit), an alphanumeric input device 1717 (e.g., a keyboard), and a user interface (UI) navigation device 1714 (e.g., a mouse). In an example, the display unit 1710, input device 1717 and UI navigation device 1714 may be a touch screen display. The computing machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The computing machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 1716 (e.g., a storage device) may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the computing machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the computing machine 1700 and that cause the computing machine 1700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726.

Machine Learning

Figure 18:
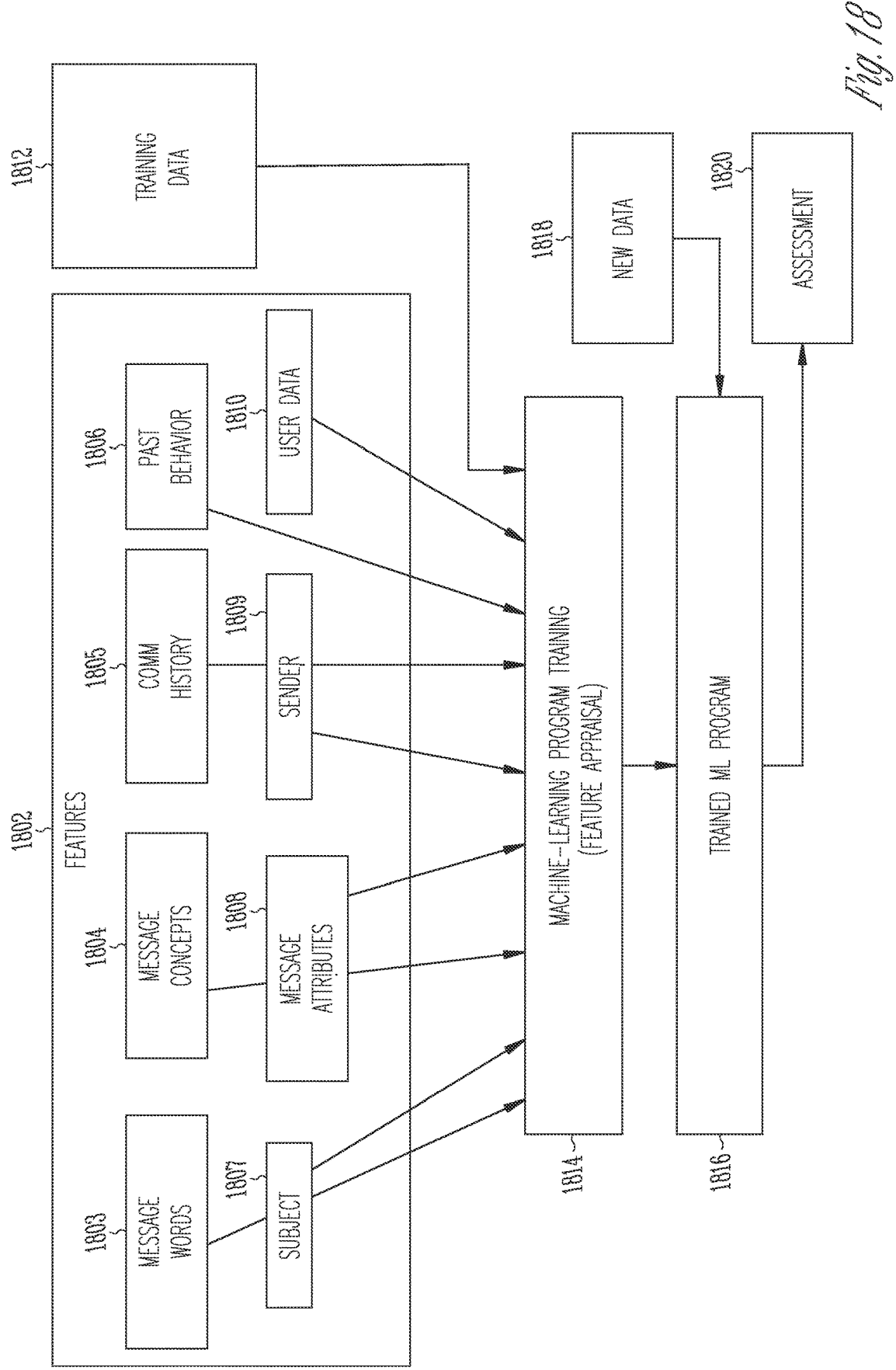
FIG. 18 illustrates the training and use of a machine-learning program, in accordance with some embodiments.
Figure 20:
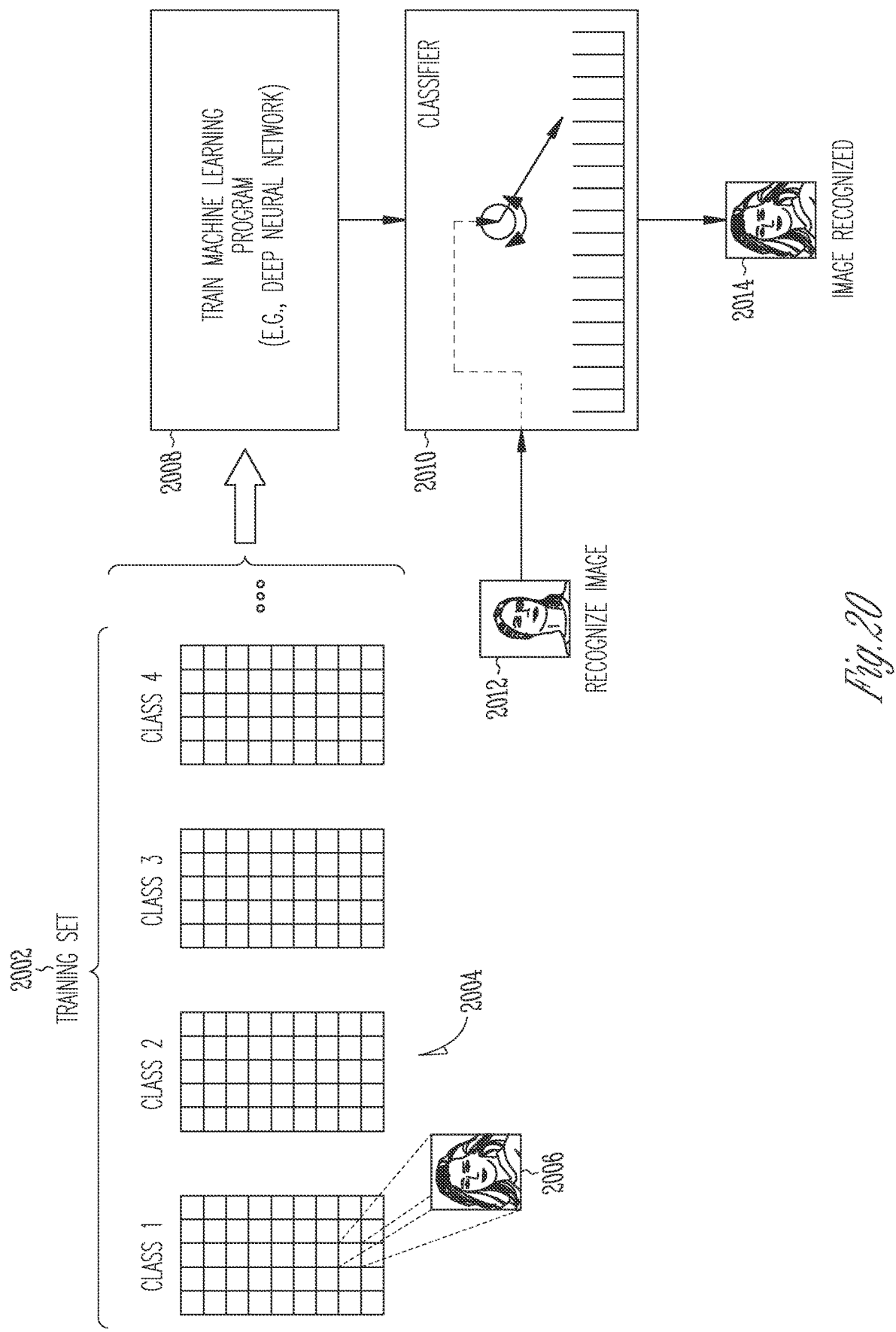
FIG. 20 illustrates the training of an image recognition machine learning program, in accordance with some embodiments.

FIGS. 18-20 are illustrative drawings describing machine learning techniques and systems that can be used to train blocks 706, 714, 812, 822, 912, 922, 1122, 1332, and 1632, for example, in accordance with some embodiments. FIG. 18 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 1818 in order to make data-driven predictions or decisions expressed as outputs or assessments 1820. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 1818 to find correlations among identified features 1802 that affect the outcome.

The machine-learning algorithms utilize features 1802 for analyzing the data to generate assessments 1820. A feature 1802 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1802 may be of different types and may include one or more of words of the message 1803, message concepts 1804, communication history 1805, past user behavior 1806, subject of the message 1807, other message attributes 1808, sender 1809, and user data 1880.

The machine-learning algorithms utilize the training data 1818 to find correlations among the identified features 1802 that affect the outcome or assessment 1820. In some example embodiments, the training data 1812 includes labeled data, which is known data for one or more identified features 1802 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 1812 and the identified features 1802, the machine-learning tool is trained at operation 1814. The machine-learning tool appraises the value of the features 1802 as they correlate to the training data 1812. The result of the training is the trained machine-learning program 1816.

When the machine-learning program 1816 is used to perform an assessment, new data 1818 is provided as an input to the trained machine-learning program 1816, and the machine-learning program 1816 generates the assessment 1820 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

FIG. 19 illustrates an example neural network 1904, in accordance with some embodiments. As shown, the neural network 1904 receives, as input, source domain data 1902. The input is passed through a plurality of layers 1906 to arrive at an output. Each layer 1906 includes multiple neurons 1908. The neurons 1908 receive input from neurons of a previous layer 1906 and apply weights to the values received from those neurons 1908 in order to generate a neuron output. The neuron outputs from the final layer 1906 are combined to generate the output of the neural network 1904.

As illustrated at the bottom of FIG. 19, the input is a vector x. The input is passed through multiple layers 1906, where weights $W_1, W_2, \ldots, W_i$ are applied to the input to each layer to arrive at $f^1(x), f^2(x), \ldots, f^{i-1}(x)$, until finally the output $f(x)$ is computed.

In some example embodiments, the neural network 1904 (e.g., deep learning, deep convolutional, or recurrent neural network) comprises a series of neurons 1908, such as Long Short Term Memory (LSTM) nodes, arranged into a network. A neuron 1908 is an architectural element used in data processing and artificial intelligence, particularly machine learning, which includes memory that may determine when to "remember" and when to "forget" values held in that memory based on the weights of inputs provided to the given neuron 1908. Each of the neurons 1908 used herein is configured to accept a predefined number of inputs from other neurons 1908 in the neural network 1904 to provide relational and sub-relational outputs for the content of the frames being analyzed. Individual neurons 1908 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

FIG. 20 illustrates the training of an image recognition machine learning program, in accordance with some embodiments. The machine learning program may be implemented at one or more computing machines. As shown, training set 2002 includes multiple classes 2004. Each class 2004 includes multiple images 2006 associated with the class. Each class 2004 may correspond to a type of object in the image 2006 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 2008 the machine learning program is trained, for example, using a deep neural network. The trained classifier 310, generated by the training of block 2008, recognizes an image 312, and at block 314 the image is recognized. For example, if the image 312 is a photograph of Bill Clinton, the classifier recognizes the image as corresponding to Bill Clinton at block 314.

FIG. 20 illustrates the training of a classifier, according to some example embodiments. A machine learning algorithm is designed for recognizing faces, and a training set 2002 includes data that maps a sample to a class 2004 (e.g., a class includes all the images of purses). The classes may also be referred to as labels or annotations. Although embodiments presented herein are presented with reference to object recognition, the same principles may be applied to train machine-learning programs used for recognizing any type of items.

The training set 2002 includes a plurality of images 2006 for each class 2004 (e.g., image 2006), and each image is associated with one of the categories to be recognized (e.g., a class). The machine learning program is trained at block 2008 with the training data to generate a classifier at block 2010 operable to recognize images. In some example embodiments, the machine learning program is a DNN.

When an input image 2012 is to be recognized, the classifier 2010 analyzes the input image 2012 to identify the class corresponding to the input image 2012. This class is labeled in the recognized image at block 2014.

Figure 21:
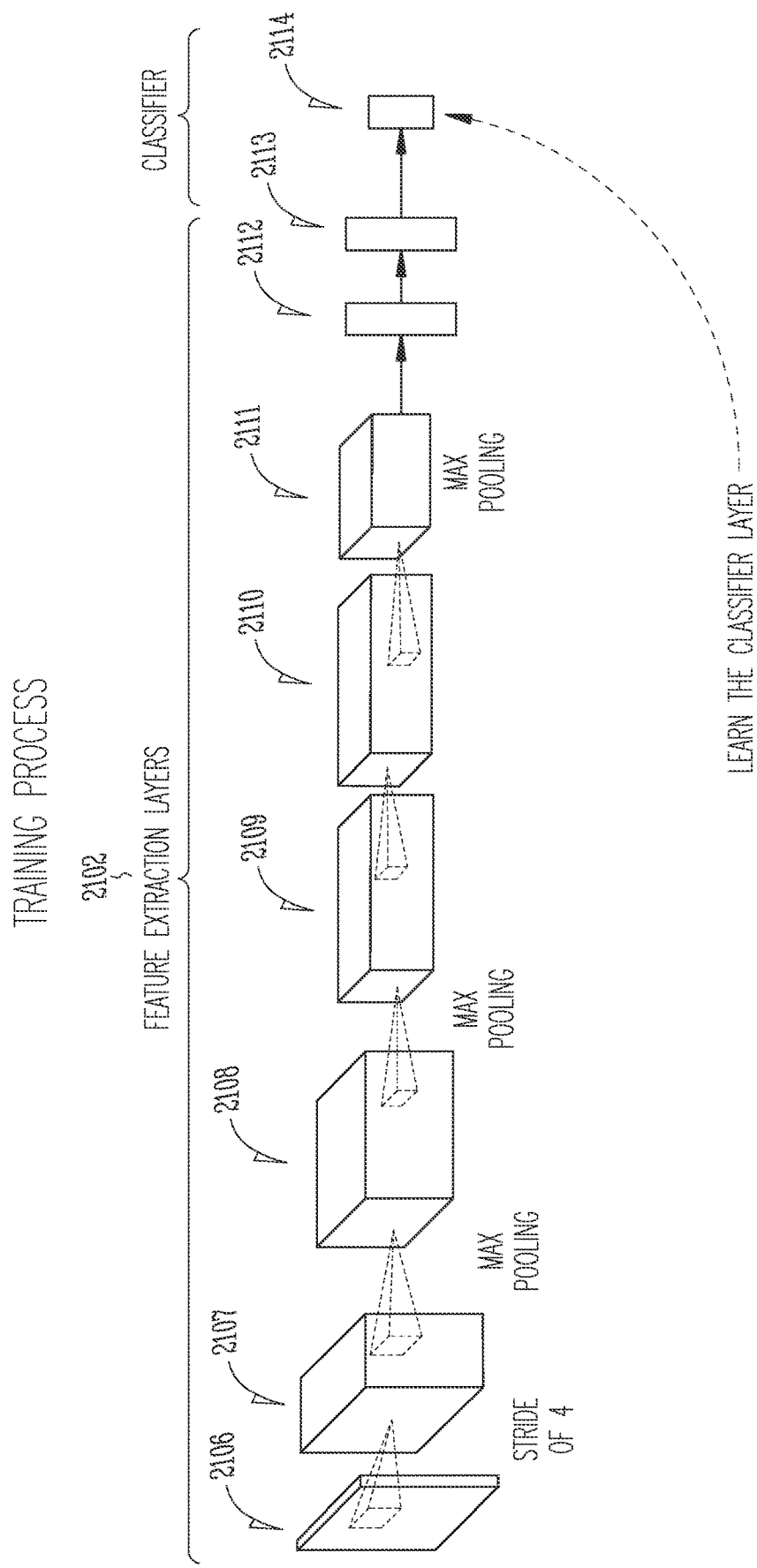
FIG. 21 illustrates the feature-extraction process and classifier training, in accordance with some embodiments.

FIG. 21 illustrates the feature-extraction process and classifier training, according to some example embodiments. Training the classifier may be divided into feature extraction layers 2102 and classifier layer 2114. Each image is analyzed in sequence by a plurality of layers 2106-2113 in the feature-extraction layers 2102.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has often been used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as by reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 2114. In FIG. 21, the data travels from left to right as the features are extracted. The goal of training the neural network is to find the parameters of all the layers that make them adequate for the desired task.

Various Geometric Parameter Calibration Examples

Example 1 can include an imaging system comprising: a memory storing instructions which, when executed by the processing circuitry, cause the processing circuitry to perform operations comprising: in a calibration mode, receiving, using a first camera, image information projected at an image plane of the first camera from a 3D world; determining based upon the image information, multiple image regions of interest (ROIs), wherein individual ones of the multiple image ROIs correspond to one or more three-dimensional (3D) world object images projected at the image plane; receiving, using a radar unit, radar information indicating one or more 3D world objects; determining based upon the radar information, multiple respective radar ROIs, wherein individual ones of the multiple radar ROIs correspond to one or more 3D world objects indicated by the radar information; determining based upon the radar information, respective 3D world distances corresponding to respective radar ROIs; determining multiple co-registered ROI pairs by co-registering individual image ROIs with individual radar ROIs corresponding to common 3D world objects; adjusting one or more first geometric parameters associated with the first camera, based upon the co-registered ROI pairs to produce adjusted first geometric parameters.

Example 2 can include the subject matter of Example 1 further including: adjusting one or more second geometric parameters associated with a second camera based upon the adjusted first geometric parameters to produce adjusted second geometric parameters.

Example 3 can include the subject matter of Example 1 wherein adjusting the one or more first geometric parameters includes for respective ones of the multiple respective co-registered ROI pairs, adjusting based upon at least one respective two-dimensional coordinate location at the image plane of the first camera where an image is projected of a 3D world object corresponding to a respective image ROI of the respective co-registered ROI pair and upon a respective 3D world distance corresponding to a respective radar unit ROI of the respective co-registered ROI pair.

Example 4 can include the subject matter of Example 1 the operations further comprising: determining a scaling factor based at least in part upon one or more of the respective 3D world distances corresponding to respective radar ROIs; wherein adjusting includes adjusting based at least in part upon the determined scaling factor.

Example 5 can include the subject matter of Example 1 the operations further including: classifying respective image ROIs, using a first trained machine learning engine; classifying respective radar unit ROIs, using a second trained machine learning engine; wherein determining the multiple co-registered ROI pairs includes matching respective image ROIs and respective radar ROIs of respective co-registered pair, based upon respective image ROI classifications and respective radar ROI classifications.

Example 6 can include the subject matter of Example 5 wherein classifying respective image ROIs, using a first trained machine learning engine, includes classifying based upon semantic segmentation.

Example 7 can include the subject matter of Example 6 the operations further including: conditioning performance of the act of adjusting upon a change in a 3D world distance corresponding to a respective radar ROI of at least one co-registered pair.

Example 8 can include the subject matter of Example 1 the operations further including: conditioning performance of the act of adjusting upon a threshold count of co-registered ROI pairs.

Example 9 can include the subject matter of Example 1 the operations further including: classifying respective image ROIs and producing corresponding image classification confidence scores, using a first trained machine learning engine; classifying respective radar unit ROIs and producing corresponding radar classification confidence scores, using a second trained machine learning engine; wherein determining the multiple co-registered ROI pairs includes matching respective image ROIs and respective radar ROIs of respective co-registered pair, based upon respective image ROI classifications and respective radar ROI classifications; further including: conditioning use of respective co-registered ROI pairs in the act adjusting upon respective image classification confidence levels and respective radar classification levels of respective image ROIs and respective radar ROIs of respective co-registered ROI pairs.

Example 10 can include the subject matter of Example 1 the operations further including: for respective ones of the multiple respective co-registered ROI pairs, determining, using the first camera, a respective first distance from a respective common 3D world object corresponding to the respective image ROI and the respective radar ROI of the respective ROI pair; determining, using the radar unit, a respective second distance from the respective common 3D world object corresponding to the respective image ROI and the respective radar ROI of the respective ROT pair; and conditioning use of respective co-registered ROI pairs in the act adjusting upon respective a threshold loss difference between respective image ROIs and radar ROIs of the respective ROI pairs.

Example 11 can include the subject matter of Example 10 wherein the loss threshold difference includes a distance threshold loss.

Example 12 can include the subject matter of Example 10 the operations further including: tracking respective trajectories of respective image ROIs; tracking respective trajectories of respective radar ROIs; wherein the loss threshold difference includes a tracking trajectory threshold loss.

Example 13 can include the subject matter of Example 1 the operations further including: periodically triggering the act of adjusting.

Example 14 can include the subject matter of Example 1 the operations further including: triggering the act of adjusting in response to occurrence of an external event.

Example 15 can include the subject matter of Example 1 wherein the one or more first geometric parameters associated with the first camera include first, second and third rotation parameters and include a height parameter.

Example 16 can include the subject matter of Example 1 wherein the one or more first geometric parameters associated with the first camera include first respective first, second and third rotation parameters and first respective first, second and third translation parameters; and wherein the one or more second geometric parameters associated with the second camera include second respective first, second and third rotation parameters and second respective first, second and third translation parameters.

Example 17 can include the subject matter of Example 1, further including: the processing circuitry; the first camera; and the radar unit, wherein the radar unit has a frame of reference geometrically registered with a frame of reference of the first camera.

Example 18 can include the subject matter of Example 2 further including: the processing circuitry; the first camera; the second camera; and the radar unit; wherein the radar unit has a frame of reference geometrically registered with a frame of reference of the first camera.

Example 19 can include the subject matter of Example 1 wherein adjusting the one or more first geometric parameters includes for respective ones of the multiple respective co-registered ROI pairs, determining a respective projection between a respective two-dimensional coordinate location, at the image plane where an image is projected of a 3D world object corresponding to a respective image ROI of the respective co-registered ROI pair, and a respective 3D world coordinate location of a 3D world object corresponding to a respective radar unit ROI of the respective co-registered ROI pair, based upon a first matrix function including the first geometric parameters; and estimating the adjusted first geometric parameters based upon a parameter fitting process using the respective projections.

Example 20 can include the subject matter of Example 2 wherein adjusting the one or more first geometric parameters includes for respective ones of the multiple respective co-registered ROI pairs, determining a respective first projection between a respective two-dimensional coordinate location, at the image plane where an image is projected of a 3D world object corresponding to a respective image ROI of the respective co-registered ROI pair, and a respective 3D world coordinate location of a 3D world object corresponding to a respective radar unit ROI of the respective co-registered ROI pair, based upon a first matrix function including the first geometric parameters; and estimating the adjusted first geometric parameters based upon a first parameter fitting process using the respective first projections; wherein adjusting the one or more second geometric parameters includes, determining respective second projections between respective two-dimensional coordinate locations, at the image plane of the first camera and respective two-dimensional coordinate locations at an image plane of the second camera, based upon the first matrix function and based upon a second matrix function including the second geometric parameters; and estimating the adjusted second geometric parameters based upon a second parameter fitting process using the respective second projections.

Example 21 can include the subject matter of Example 1 the operations further comprising: in a functional mode, receiving, using the first camera, image information including a projection including an image of a 3D world object at the image plane of the first camera; and determining a distance from the 3D world object based upon the projection at the image plane and the adjusted first geometric parameters.

Example 22 can include the subject matter of Example 1 the operations further comprising: in a functional mode, receiving, using the first camera, image information including a first projection including an image of a 3D world object at the image plane of the first camera; receiving, using the second camera, image information including a second projection including an image of the 3D world object at an image plane of the second camera; and determining a distance from the 3D world object based upon the first projection at the image plane of the first camera, the second projection at the image plane of the second camera and the adjusted first and second geometric parameters.

Various Photometric Parameter Calibration Examples

Example 23 can include an imaging system comprising: a memory storing instructions which, when executed by the processing circuitry, cause the processing circuitry to perform operations comprising: receiving first image information including an image of an object, using a first camera calibrated using a first group of intrinsic parameters values; determining, using the first camera, luminance information associated with the received first image information; receiving, using a radar unit, radar information indicating an object; determining based upon the radar information, a speed to associate with the object; and adjusting one or more photometric parameters of the first group based upon the determined luminance information and the associated speed of the object.

Example 24 can include the subject matter of Example 23 the operations further including: classifying the object, using a trained machine learning engine; wherein adjusting further includes adjusting based at least in part upon classification of the object.

Example 25 can include the subject matter of Example 23 wherein classifying the object further includes classifying, using the radar unit configured with a trained machine learning engine.

Example 26 can include the subject matter of Example 23 wherein the first group of photometric parameters values includes a gain parameter value; and wherein adjusting one or more values of the first group of photometric parameters values in includes adjusting the gain parameter value based upon the determined luminance information and the tracked speed.

Example 27 can include the subject matter of Example 23 wherein the first group of photometric parameters values includes an exposure parameter value; and wherein adjusting one or more values of the first group of photometric parameters values in includes adjusting the exposure parameter value based upon the determined luminance information and the tracked speed.

Example 28 can include the subject matter of Example 23 wherein first group of photometric parameters values includes an automatic white balance (AWB) parameter value; and the operations further including: modifying white balance within the received information based upon the AWB parameter value; wherein adjusting one or more values of the first group of photometric parameters values in includes adjusting the AWB parameter value based upon the determined luminance information and the tracked speed.

Example 29 can include the subject matter of Example 23 wherein the first group of photometric parameters values includes a high dynamic range (HDR) parameter value; and the operations further including: modifying the received first image information based upon the HDR parameter value; wherein adjusting one or more values of the first group of photometric parameters values in includes adjusting the HDR parameter value based upon the determined luminance information and the tracked speed.

Example 30 can include the subject matter of Example 23 the operations further including: determining an image region of interest (ROT) within the first image information that corresponds to an image object; receiving, using the radar unit, radar information; determining a radar ROI within the radar information that corresponds to a radar object; determining a co-registered ROI pair by co-registering the image ROI with the radar ROT; and determining that the image ROI of the co-registered ROI pair corresponds to the object.

Example 31 can include the subject matter of Example 30 the operations further including: associating the speed of the object with the received first image information based upon the determination that image ROI of the co-registered ROI pair corresponds to the object.

Example 32 can include the subject matter of Example 30 the operations further including: classifying the image ROI, using a first trained machine learning engine; classifying the radar unit ROI, using a second trained machine learning engine; wherein determining the co-registered ROI pair includes matching the image ROIs and the radar ROI, based upon a respective image ROI classification and a respective radar ROI classification.

Example 33 can include the subject matter of Example 32 wherein adjusting further includes adjusting based at least in part upon classification of the object.

Example 34 can include the subject matter of Example 23 the operations further including: receiving second image information including an image of the object, using a second camera calibrated using a second group of photometric parameters values; determining, using the second camera, second luminance information associated with the second image information received using the second camera; wherein adjusting further includes adjusting one or more values of the second group of photometric parameters values based upon the determined second luminance information and the tracked speed.

Example 36 can include the subject matter of Example 35 the operations further including: receiving second image information including an image of the object, using a second camera calibrated using a second group of photometric parameters values; determining, using the second camera, second luminance information associated with the second image information received using the second camera; tracking, using a radar unit, distance between the object and the radar unit; wherein adjusting further includes adjusting one or more values of the first group of photometric parameters values based upon the first luminance information, the second luminance information, and the tracked distance, and further includes adjusting one or more values of the second group of photometric parameters values based upon the first luminance information, the second luminance information, and the tracked distance.

Example 36 can include the subject matter of Example 35 the operations further including: determining illumination intensity of multiple illumination devices, located at different locations to illuminate the object, based upon the tracked distance.

Example 37 can include the subject matter of Example 36 the operations further including: classifying the object, using the radar unit; wherein determining illumination intensity further includes determining, based at least in part upon classification of the object.

Example 38 can include the subject matter of Example 37 the operations further including: wherein classifying the object includes classifying, using the radar unit configured with a trained machine learning engine.

Example 39 can include the subject matter of Example 35 the operations further including: determining a first image region of interest (ROI) within the first image information that corresponds to a first image object; determining a second image ROI within the second image information that corresponds to a second image object; receiving, using the radar unit, radar information; determining a radar ROI within the radar information that corresponds to a radar object; determining a first co-registered ROI pair by co-registering the first image ROI with the radar ROI; determining a second co-registered ROI pair by co-registering the second image ROI with the radar ROI; and determining that the first image ROI of the second co-registered ROI pair corresponds to the object determining that the second image ROI of the second co-registered ROI pair corresponds to the object.

Example 40 can include the subject matter of Example 39 the operations further including: associating the speed of the object with the received first image information based upon the determination that the first image ROI of the first co-registered ROI pair corresponds to the object; and associating the speed of the object with the received second image information based upon the determination that the second image ROI of the second co-registered ROI pair corresponds to the object.

Example 41 can include the subject matter of Example 1 further including: the processing circuitry; the first camera; and the radar unit.

Example 42 can include the subject matter of Example 35 further including: the processing circuitry; the first camera; the second camera; and the radar unit.

Example 43 can include a memory storing instructions which, when executed by the processing circuitry, cause the processing circuitry to perform operations comprising: receiving first image information including an image of an object, using a first camera calibrated using a first group of photometric parameters values; determining, using the first camera, respective luminance information associated with the received first image information; receiving, using a radar unit, radar information; classifying the object, based upon the radar information, using a trained machine learning engine; adjusting one or more values of the first group of photometric parameters values based upon the determined luminance information and the classification.

Example 44 can include the operations of Example 43, further including: receiving second image information including an image of the object, using a second camera calibrated using a second group of photometric parameters values; determining, using the second camera, second luminance information associated with the second image information received using the second camera; classifying the object, based upon the radar information, using a trained machine learning engine; tracking, using a radar unit, distance between the object and the radar unit; wherein adjusting further includes adjusting one or more values of the first group of photometric parameters values based upon the first luminance information, the second luminance information, and the classification; and further includes adjusting one or more values of the second group of photometric parameters values based upon the first luminance information, the second luminance information, and the classification.

Example 45 can include an the operations further including: determining illumination intensity of multiple illumination devices, located at different locations to illuminate the object, based upon the tracked distance.

Example 46 can include a memory storing instructions which, when executed by the processing circuitry, cause the processing circuitry to perform operations comprising acts of: receiving, using a first camera calibrated using a first group of photometric parameters that include one or more adjustable parameter values, a first sequence of respective first image frames including an image of an object; determining, using the first camera, a sequence of respective first luminance information signals corresponding to respective first image frames of the first sequence of respective image frames; tracking, using a radar unit, speed of the object; determining in response to each of one or more respective received first image frames in the sequence of respective first image frames, one or more of adjusted parameters values, based upon respective corresponding luminance information signals and the tracked speed of the object; and adjusting one or more of the adjustable parameters values within the first group of photometric parameters, in response to one or more acts of determining one or more adjusted parameters values.

Geometric Parameter Calibration Method Example

Example 47 can include a calibration method comprising: receiving, using a first camera, image information projected at an image plane of the first camera from a 3D world; determining based upon the image information, multiple image regions of interest (ROIs), wherein individual ones of the multiple image ROIs correspond to one or more three-dimensional (3D) world object images projected at the image plane; receiving, using a radar unit, radar information indicating one or more 3D world objects; determining based upon the radar information, multiple respective radar ROIs, wherein individual ones of the multiple radar ROIs correspond to one or more 3D world objects indicated by the radar information; determining based upon the radar information, respective 3D world distances corresponding to respective radar ROIs; determining multiple co-registered ROI pairs by co-registering individual image ROIs with individual radar ROIs corresponding to common 3D world objects; adjusting one or more first geometric parameters associated with the first camera, based upon the co-registered ROI pairs to produce adjusted first geometric parameters.

Photometric Parameter Calibration Method Example

Example 48 can include a calibration method comprising: receiving first image information including an image of an object, using a first camera calibrated using a first group of photometric parameters; determining, using the first camera, respective luminance information associated with the received first image information; tracking, using a radar unit, speed of the object; and adjusting one or more photometric parameters of the group based upon the determined luminance information and the tracked speed of the object.

These and other features and advantages of the embodiments will be understood from the following claims.

The invention claimed is:

1. An imaging system comprising:
a memory storing instructions which, when executed by processing circuitry, cause the processing circuitry to perform operations comprising:
receiving first image information including an image of an object, using a first camera calibrated using a first group of photometric parameters;
determining, using the first camera, first luminance information associated with the first image information;
receiving, using a radar unit, radar information indicating the object;
determining based upon the radar information, a speed to associate with the object; and
adjusting one or more values of the first group of photometric parameters based upon the first luminance information and the speed of the object.

2. The imaging system of claim 1, wherein:
the operations further comprise classifying the object using a trained machine learning engine, and
adjusting the one or more values of the first group of photometric parameters is based at least in part upon classification of the object.

3. The imaging system of claim 1, wherein:
the first group of photometric parameters includes a gain parameter; and
adjusting the one or more values of the first group of photometric parameters comprises adjusting a value of the gain parameter based upon the first luminance information and the speed.

4. The imaging system of claim 1, wherein:
the first group of photometric parameters includes an exposure parameter, and
adjusting one or more values of the first group of photometric parameters comprises adjusting a value of the exposure parameter based upon the first luminance information and the speed.

5. The imaging system of claim 1, wherein:
the first group of photometric parameters includes an automatic white balance (AWB) parameter,
the operations further comprise modifying a white balance within the first image information based upon a value of the AWB parameter, and
adjusting one or more values of the first group of photometric parameters comprises adjusting the AWB parameter value based upon the first luminance information and the speed.

6. The imaging system of claim 1, wherein:
the first group of photometric parameters includes a high dynamic range (HDR) parameter,
the operations further comprise modifying the first image information based upon a value of the HDR parameter, and
adjusting one or more values of the first group of photometric parameters comprises adjusting the HDR parameter value based upon the first luminance information and the speed.

7. The imaging system of claim 1, wherein the operations further comprise:
determining, within the first image information, an image region of interest (ROI) that corresponds to an image object;
determining, within the radar information, a radar ROI that corresponds to a radar object;
determining a co-registered ROI pair by co-registering the image ROI with the radar ROI; and
determining that the image ROI of the co-registered ROI pair corresponds to the object.

8. The imaging system of claim 7, wherein the operations further comprise associating the speed of the object with the first image information based upon a determination that the image ROI of the co-registered ROI pair corresponds to the object.

9. The imaging system of claim 7, wherein:
the operations further comprise:
classifying the image ROI using a first trained machine learning engine;
classifying the radar ROI using a second trained machine learning engine; and
determining the co-registered ROI pair comprises matching the image ROI and the radar ROI based upon a respective image ROI classification and a respective radar ROI classification.

10. The imaging system of claim 9, wherein adjusting the one or more values of the first group of photometric parameters is based at least in part upon classification of the object.

11. The imaging system of claim 1, wherein the operations further comprise:
receiving second image information including another image of the object using a second camera calibrated using a second group of photometric parameters;
determining, using the second camera, second luminance information associated with the second image information received using the second camera; and
adjusting one or more values of the second group of photometric parameters based upon the second luminance information and the speed of the object.

12. The imaging system of claim 1, wherein the operations further comprise:
receiving second image information including another image of the object using a second camera calibrated using a second group of photometric parameters;
determining, using the second camera, second luminance information associated with the second image information received using the second camera;
tracking, using the radar unit, a distance between the object and the radar unit;
adjusting the one or more values of the first group of photometric parameters based upon the first luminance information, the second luminance information, and the distance; and
adjusting one or more values of the second group of photometric parameters based upon the first luminance information, the second luminance information, and the distance.

13. The imaging system of claim 12, wherein the operations further comprise determining illumination intensity of multiple illumination devices, located at different locations to illuminate the object, based upon the distance.

14. The imaging system of claim 13, wherein:
the operations further comprise classifying the object using the radar unit, and
determining the illumination intensity is based at least in part upon classification of the object.

15. The imaging system of claim 12, wherein the operations further comprise:
determining, within the first image information, a first image region of interest (ROI) that corresponds to a first image object;
determining, within the second image information, a second image ROI that corresponds to a second image object;

determining, within the radar information, a radar ROI that corresponds to a radar object;

determining a first co-registered ROI pair by co-registering the first image ROI with the radar ROI;

determining a second co-registered ROI pair by co-registering the second image ROI with the radar ROI;

determining that the first image ROI of the first co-registered ROI pair corresponds to the object; and determining that the second image ROI of the second co-registered ROI pair corresponds to the object.

16. The imaging system of claim 15, wherein the operations further comprise:

associating the speed of the object with the first image information based upon a determination that the first image ROI of the first co-registered ROI pair corresponds to the object; and associating the speed of the object with the second image information based upon a determination that the second image ROI of the second co-registered ROI pair corresponds to the object.

17. The imaging system of claim 12, further comprising: the processing circuitry; the first camera; the second camera; and the radar unit.

18. The imaging system of claim 1, further comprising the processing circuitry; the first camera; and the radar unit.

19. A memory storing instructions which, when executed by processing circuitry, cause the processing circuitry to perform operations comprising:

receiving first image information including an image of an object, using a first camera calibrated using a first group of photometric parameters;

determining, using the first camera, first luminance information associated with the first image information;

receiving, using a radar unit, radar information;

classifying the object, based upon the radar information, using a trained machine learning engine; and adjusting one or more values of the first group of photometric parameters based upon the first luminance information and classification of the object.

20. The memory of claim 19, wherein the operations further comprise:

receiving second image information including another image of the object, using a second camera calibrated using a second group of photometric parameters;

determining, using the second camera, second luminance information associated with the second image information received using the second camera;

tracking, using the radar unit, a distance between the object and the radar unit; and adjusting, based upon the first luminance information, the second luminance information, and the classification, one or more values of the first group of photometric parameters and one or more values of second group of photometric parameters.

21. The memory of claim 20, wherein the operations further comprise determining illumination intensity of multiple illumination devices, located at different locations to illuminate the object, based upon the distance.

22. A memory storing instructions which, when executed by processing circuitry, cause the processing circuitry to perform operations comprising:

receiving, using a first camera calibrated using a first group of photometric parameters that include one or more adjustable parameters, a first sequence of respective first image frames including an image of an object;

determining, using the first camera, a sequence of respective first luminance information signals corresponding to respective first image frames of the first sequence of respective first image frames;

tracking, using a radar unit, a speed of the object;

determining, in response to each of one or more of the respective first image frames in the first sequence of respective first image frames, one or more values of the one or more adjustable parameters, based upon respective corresponding luminance information signals and the speed of the object; and adjusting the one or more values of the one or more adjustable parameters in response to a determination of the one or more values of the one or more adjustable parameters.

23. A calibration method comprising:

receiving first image information including an image of an object, using a first camera calibrated using a first group of photometric parameters;

determining, using the first camera, respective luminance information associated with the first image information;

tracking, using a radar unit, a speed of the object; and adjusting values of one or more photometric parameters of the first group of photometric parameters based upon the respective luminance information and the speed of the object.

24. The imaging system of claim 1, wherein:

the first camera includes a pixel sensor array and is calibrated using a first group of photometric parameters; and the operations further comprise determining, using the first camera, the first luminance information associated with the first image information, based upon light intensity incident upon the pixel sensor array.

25. The memory of claim 19, wherein:

the first camera includes a pixel sensor array and is calibrated using the first group of photometric parameters; and the operations further comprise determining, using the first camera, the first luminance information associated with the first image information, based upon light intensity incident upon the pixel sensor array.

26. The memory of claim 22, wherein:

the first camera includes a pixel sensor array and is calibrated using the first group of photometric parameters; and the sequence of respective first luminance information signals corresponding to respective first image frames of the first sequence of respective first image frames is determined based upon light intensity incident upon the pixel sensor array.

27. The calibration method of claim 23, wherein:

the first camera includes a pixel sensor array and is calibrated using the first group of photometric parameters; and the respective luminance information associated with the first image information is determined based upon light intensity incident upon the pixel sensor array.

* * * * *